(12) United States Patent
Ishii et al.

(10) Patent No.: US 8,571,217 B2
(45) Date of Patent: Oct. 29, 2013

(54) DISPLAY SYSTEM, CONTROL APPARATUS, DISPLAY METHOD, AND PROGRAM

(75) Inventors: Junichirou Ishii, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 20 days.

(21) Appl. No.: 13/140,679

(22) PCT Filed: Dec. 18, 2009

(86) PCT No.: PCT/JP2009/071104
§ 371 (c)(1),
(2), (4) Date: Jun. 17, 2011

(87) PCT Pub. No.: WO2010/071193
PCT Pub. Date: Jun. 24, 2010

(65) Prior Publication Data
US 2011/0243325 A1 Oct. 6, 2011

(30) Foreign Application Priority Data
Dec. 18, 2008 (JP) .................................. 2008-322372

(51) Int. Cl.
*G09G 5/00* (2006.01)
(52) U.S. Cl.
USPC ................ 380/218; 345/1.1; 345/50; 345/77; 345/84; 345/589; 345/619
(58) Field of Classification Search
USPC .......... 380/218; 345/1.1, 50, 77, 84, 589, 619
See application file for complete search history.

(56) References Cited

U.S. PATENT DOCUMENTS

| 6,137,457 A * | 10/2000 | Tokuhashi et al. ................. 345/8 |
| 2003/0118183 A1* | 6/2003 | Struyk ........................... 380/213 |
| 2003/0133569 A1* | 7/2003 | Stern et al. .................... 380/206 |
| 2007/0296889 A1* | 12/2007 | Struyk ............................ 349/96 |

FOREIGN PATENT DOCUMENTS

| JP | 63-312788 | 12/1988 |
| JP | 4-046387 | 2/1992 |
| JP | 06-105256 | 4/1994 |
| JP | 07-175448 | 7/1995 |
| JP | 2000-163042 | 6/2000 |
| JP | 2007-537463 | 12/2007 |
| WO | WO 2008/102883 | 8/2008 |
| WO | WO 2008/146752 | 12/2008 |

OTHER PUBLICATIONS

International Search Report, PCT/JP2009/071104, Jan. 26, 2010.

* cited by examiner

*Primary Examiner* — Ellen Tran
(74) *Attorney, Agent, or Firm* — Young & Thompson

(57) ABSTRACT

A display system includes display terminals (1-1-1-4) that display pictures, a display control apparatus (3) that controls the display of pictures on the display terminals (1-1-1-4), and optical shutters (2-1-2-4) that are provided corresponding to each of the display terminals (1-1-1-4) and that enter a state of transmitting incident light in intervals in which private pictures are displayed on corresponding terminals and enter a state of blocking incident light in other intervals. The display control apparatus (3) controls the display terminals (1-1-1-4) such that private pictures are not simultaneously displayed on display terminals (1-1-1-4).

34 Claims, 20 Drawing Sheets

Fig.19

| | | Next subframe picture data | | | | | | |
|---|---|---|---|---|---|---|---|---|
| | | 0 | 1 | 2 | 3 | .... | 2 | 3 |
| Current subframe picture data | 0 | 10 | 10 | 11 | 12 | | 255 | 255 |
| | 1 | 10 | 10 | 11 | 11 | | 255 | 255 |
| | 2 | 10 | 10 | 11 | 11 | | 255 | 254 |
| | 3 | 10 | 10 | 10 | 10 | | 254 | 254 |
| | ⋮ | ⋮ | ⋮ | ⋮ | ⋮ | ⋮ | ⋮ | ⋮ |
| | 254 | 0 | 0 | 2 | 3 | | 238 | 239 |
| | 255 | 0 | 0 | 2 | 3 | | 236 | 228 |

18-1

DISPLAY SYSTEM, CONTROL APPARATUS, DISPLAY METHOD, AND PROGRAM

TECHNICAL FIELD

The present invention relates to a display system, a control apparatus, a display method, and a program.

BACKGROUND ART

In recent years, flat panel displays such as liquid crystal displays and plasma displays are being widely applied to various devices from mobile equipment such as portable telephones to large-scale devices such as public displays.

In this development of displays, emphasis has been placed on such factors as wide angle of field, high luminance, and high picture quality, and displays have been sought that provide superior display of images to users at any angle.

On the other hand, in the current state of ubiquitous computing that has come with the development of information equipment, the prevention of viewing by others of data of personal information or confidential information that is shown on displays has become an important problem.

In portable telephones of recent years, optical screens (louvers) have been provided to produce displays that allow viewing of display content only from a specific direction, but other people at locations substantially directly opposite the display such as directly behind the user are able to view the displayed data, rendering such displays inadequate from the standpoint of protecting confidentiality.

A picture display device has been proposed that allows viewing of a specific picture only by a viewer that is wearing viewing glasses having a picture-selection capability (refer to JP-A-S63-312788 (hereinbelow referred to as Patent Document 1)).

The picture display device disclosed in Patent Document 1 displays both pictures (hereinbelow referred to as private pictures) that can be viewed only by a user that is wearing viewing glasses having a picture-selection capability and other pictures (hereinbelow referred to as the public pictures) that can be viewed by a person not wearing these viewing glasses.

As shown in FIG. 1, the picture display device disclosed in Patent Document 1 is composed of picture information storage memory 402, synthesis circuit 405, saturation/brightness conversion circuit 406, picture display 408, viewing glasses-shutter timing generation circuit 409, and viewing glasses 411.

Based on frame signal 403, picture information storage memory 402 stores picture signal 401 that is received as input in frame units. The picture signal that is stored in picture information storage memory 402 is read two times at the frame period.

The picture signal that is read first is supplied to synthesis circuit 405 as first picture signal 404 that is compressed by one-half. The picture signal that is read second is supplied to synthesis circuit 405 as second picture signal 407 after undergoing a saturation and brightness conversion process by saturation/brightness conversion circuit 406.

The output of synthesis circuit 405 is supplied to picture display 408 as a display signal. Picture display 408 alternately displays a picture that is based on first picture signal 404 and a picture based on second picture signal 407.

Based on frame signal 403, viewing glasses-shutter timing generation circuit 409 generates viewing glasses-shutter drive signal 410 for driving a shutter that is equipped in viewing glasses 411. Viewing glasses-shutter drive signal 410 is a timing signal such that the shutter of viewing glasses 411 is ON (blocked state) in the interval in which a picture is displayed based on second picture signal 407. By driving the shutter of viewing glasses 411 based on viewing glasses-shutter drive signal 410 that is supplied as output from viewing glasses-shutter timing generation circuit 409, the user that is wearing viewing glasses 411 views only the pictures that are based on first picture signal 404.

A person other than the user who is not wearing viewing glasses 411 sees a gray picture in which the picture based on first picture signal 404 and the picture based on second picture signal 407 are merged due to the visual integral effect (afterimage) over time. This gray picture is a completely different picture from the picture based on first picture signal 404, and as a result, a person not wearing viewing glasses 411 is unable to view the picture that is based on first picture signal 404.

DISCLOSURE OF THE INVENTION

In a form of utilization provided with a plurality of picture display apparatuses that are equipped with the picture display and viewing glasses described in Patent Document 1 in which a plurality of users each individually and simultaneously use the picture display apparatuses, the following problems arise.

The picture displays of each picture display apparatus switch and display pictures at mutually independent frequencies (frame rates) and phases. In addition, each of the viewing glasses that are provided corresponding to each picture display is subjected to ON/OFF control synchronized to the display period of the corresponding picture display. In this case, depending on the display timing of pictures of the picture display of each picture display apparatus, a user of a particular picture display apparatus that sees a picture that is being displayed by the picture display of another picture display apparatus through the viewing glasses he or she is wearing will perceive private pictures, public pictures, or mixed pictures of these pictures at a fixed period. This perceived picture is perceived as a flicker that is extremely distracting to the viewer.

For example, it is assumed that two users who are seated next to each other in a train or airplane are using separate picture display apparatuses (including the picture display and viewing glasses) to work. In this state, while one user is viewing the screen of the picture display he or she is using through the viewing glasses, all or a portion of the screen of the picture display that is being used by the other adjacent user enters the edge of the field of view of the user. People typically have a vision characteristic by which flicker at the periphery of the field of view is more perceptible than at the center of the field of view. As a result, when the pictures (private pictures, public pictures, or mixed pictures of these pictures) that are being switched at a fixed period on the picture display that is being used by the other adjacent user enter the periphery of the field of view of the user, these pictures will be more strongly perceived as a flicker. This effect will also apply equally to the other user who is adjacent.

Thus, in a state of use in which each of a plurality of users are simultaneously using separate picture display apparatuses that are arranged in proximity, the problem arises that the screens displayed on picture display apparatuses that are being used by other users are perceived as flicker in the field of view of users who are wearing viewing glasses (optical shutters).

The present invention has as an object the provision of a display system, control apparatus, display method, and program that solve the above-described problem.

To achieve the above-described object, the display system of the present invention includes: a plurality of terminals that display pictures; a control apparatus that controls displaying the pictures on the plurality of terminals; and a plurality of optical shutters provided corresponding to each of the plurality of terminals and that are placed in a state of transmitting incident light in intervals in which the pictures are displayed on the corresponding terminals and in a state of blocking incident light in other intervals. The control apparatus controls the plurality of terminals such that the pictures are not displayed simultaneously on the plurality of terminals.

The control apparatus of the present invention includes: a communication unit that carries out communication with each of a plurality of terminals that display pictures in accordance with a display timing signal that is applied as input; and a display control unit that controls displaying the pictures on a plurality of terminals. The display control unit determines the display timings of the pictures for each of the plurality of terminals such that the pictures are not displayed simultaneously on the plurality of terminals and transmits, as a display timing signal, a signal that includes the display timings that were determined to each of the plurality of terminals through the communication unit.

In addition, the display method of the present invention is a display method in a display system that includes a plurality of terminals that display pictures, a control apparatus that carries out communication with the plurality of terminals, and a plurality of optical shutters provided corresponding to each of the plurality of terminals and that carry out communication with corresponding terminals; the display method comprising: determining, by the control apparatus, the display timings of the pictures for each of the plurality of terminals such that the pictures are not displayed simultaneously on the plurality of terminals, and transmitting, by the control apparatus, to each of the plurality of terminals a display timing signal that includes the display timings that were determined; displaying, by each of the plurality of terminals, the pictures in accordance with the display timing signals that were received from the control apparatus, and transmitting, by each of the plurality of terminals, to corresponding optical shutters a synchronizing signal that indicates the display intervals of the pictures; and carrying out, by each of the plurality of optical shutters, switching between a state of transmitting incident light and a state of blocking incident light in accordance with the synchronizing signal that was received from the corresponding terminal.

The program of the present invention is the program of a control apparatus that is capable of communication with each of a plurality of terminals that display pictures in accordance with a display timing signal that is received as input and causes a computer of the control apparatus to execute processes of determining the display timings of the pictures for each of the plurality of terminals such that the pictures are not displayed simultaneously on the plurality of terminals, and transmitting a signal that includes the display timings that were determined as the display timing signal to each of the plurality of terminals.

BRIEF DESCRIPTION OF THE DRAWINGS

FIG. 19 shows an example of the data structure of the overdrive lookup table that is used in the display terminal shown in FIG. 18.

Figure 1:
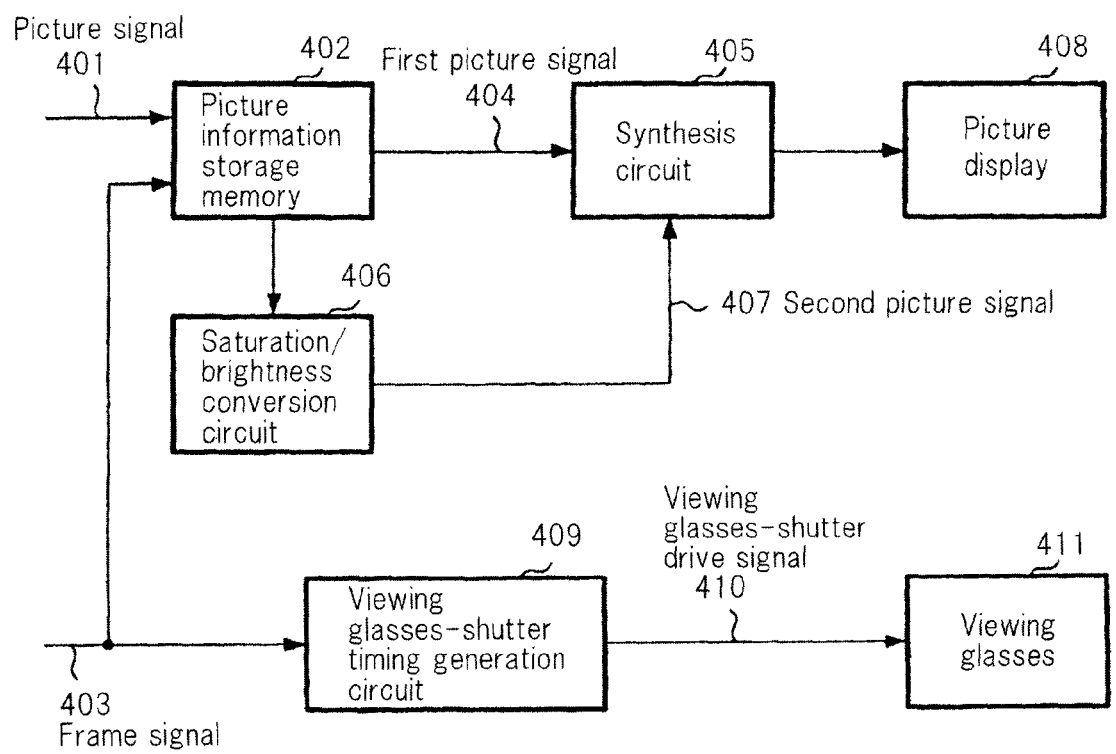
FIG. 1 shows an example of the configuration of a typical picture display apparatus.

EXPLANATION OF REFERENCE NUMERALS 1-1, 1-2, 1-3, 1-4 display terminal
11-1, 11-2, 11-3, 11-4 communication unit
12-1, 12-2, 12-3, 12-4 display unit
121 scan line
122 signal line
123 scan line driver
124 signal line driver
125 picture element
126 storage capacitance
127 thin-film transistor
129 backlight
129A lighting control unit
13-1, 13-2, 13-3, 13-4 optical shutter control unit
14-1, 14-2 key generation unit
15-1, 15-2 decryption unit
2-1, 2-2, 2-3, 2-4 optical shutter
3 display control apparatus
31 communication unit
32 display control unit
321 frame time determination unit
322 subframe number determination unit
323 subframe time determination unit
324 display order determination unit
33 frame synchronization control unit
34 encryption unit

BEST MODE FOR CARRYING OUT THE INVENTION

Exemplary embodiments of the present invention are next described with reference to the accompanying drawings.
First Exemplary Embodiment FIG. 2 is a block diagram showing the configuration of the display system that is the first exemplary embodiment of the present invention.

Figure 2:
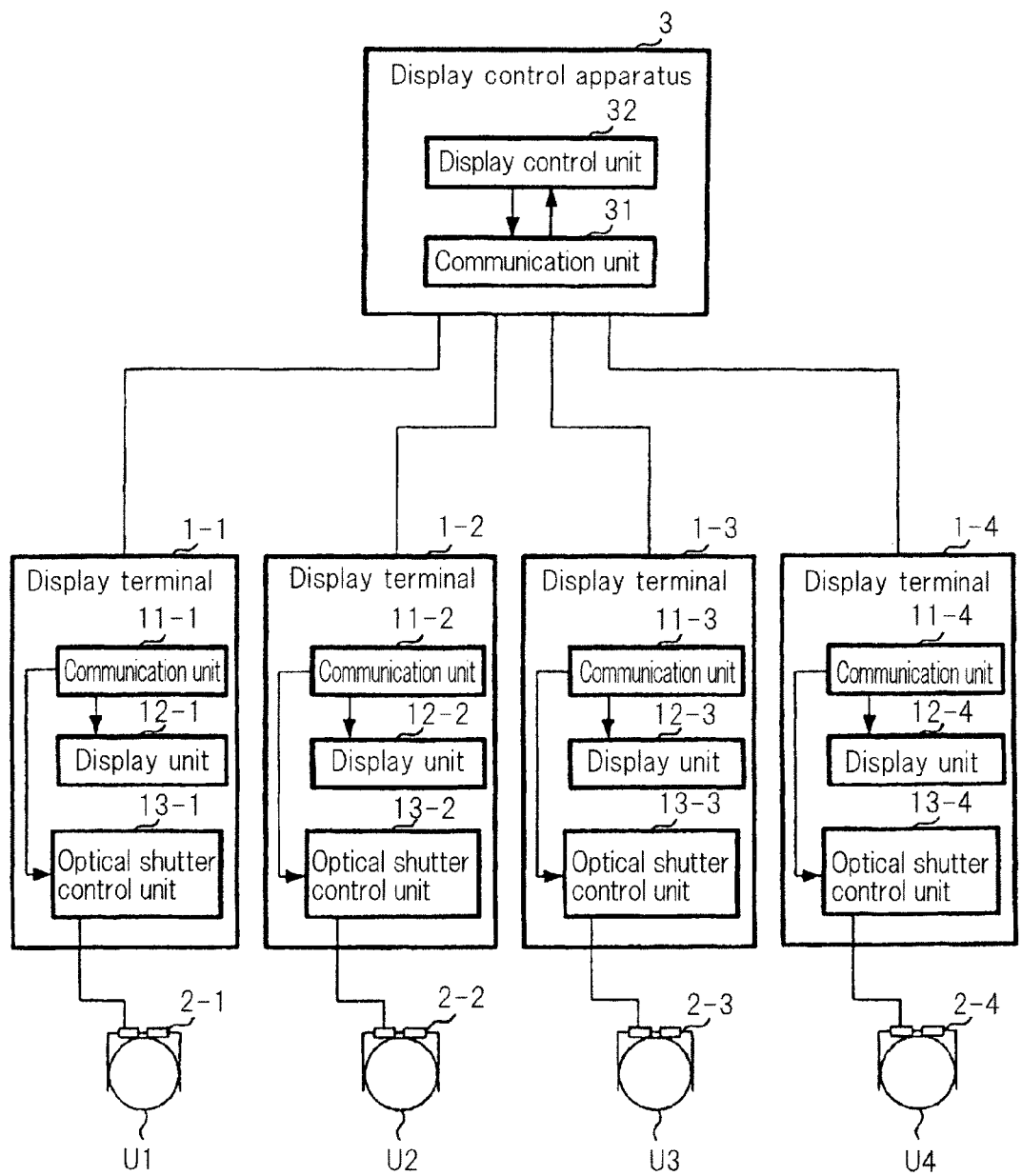
FIG. 2 is a block diagram showing the configuration of the display system that is the first exemplary embodiment of the present invention.

As shown in FIG. 2, the display system of the present exemplary embodiment includes a plurality of display terminals 1-1-1-4, optical shutters 2-1-2-4, and display control apparatus 3.

Display terminals 1-1-1-4 each include display units 12-1-12-4, respectively, that display any picture and are capable of carrying out, for example, the time-division display of a plurality of pictures.

Each of display terminals 1-1-1-4 may be, for example, a terminal equipped with a display unit in the apparatus main unit such as a notebook personal computer or a terminal in which the display unit is provided separate from the apparatus main unit such as a desktop personal computer. In addition, although the number of display terminals in FIG. 2 is four, the present invention is not limited to this number. The number of display terminals should be a plurality.

Display terminals 1-1-1-4 and display control apparatus 3 are connected to each other to enable communication with each other. The method of connecting display terminals 1-1-1-4 and display control apparatus 3 may be a wired connection such as a network cable or USB (Universal Serial Bus) or may be a wireless connection such as a wireless LAN (Local Area Network) or Bluetooth (Registered Trademark). The network by which display terminals 1-1-1-4 and display control apparatus 3 are connected may be freely selected and may be, for example, LAN or WAN (Wide Area Network).

In addition, display terminals 1-1-1-4 and optical shutters 2-1-2-4 are in a one-to-one correspondence, and corresponding display terminals and optical shutters are connected to enable communication. For example, display terminal 1-1 and optical shutter 2-1 are connected to enable communication.

Each of optical shutters 2-1-2-4 are shutters for viewing private pictures SR that are displayed on each of display terminals 1-1-1-4, respectively. For example, optical shutter 2-1 is a shutter for viewing private pictures SR that are displayed on display terminal 1-1.

Private pictures SR are pictures that can be viewed only by users who are wearing optical shutters 2-1-2-4 that are operated by synchronizing signals transmitted in from each of display terminals 1-1-1-4, respectively. In addition, private pictures SR are pictures that contain private information (predetermined content) such as personal information.

Optical shutters 2-1-2-4 may take a form that can be worn by users such as viewing glasses or goggles, or may take the form of a card.

Display control apparatus 3 is a control apparatus that controls the display timings of pictures that are displayed on display units 12-1-12-4 of each of display terminals 1-1-1-4.

More specifically, display control apparatus 3 controls the display timings at which private pictures SR, inverted pictures RV, and public pictures PB are displayed on each of display terminals 1-1-1-4 such that the users of each of display terminals 1-1-1-4 are unable to view private pictures SR displayed on display terminals other than the display terminal that the users are using. This control is hereinbelow referred to as "exclusive display control."

Figure 3:
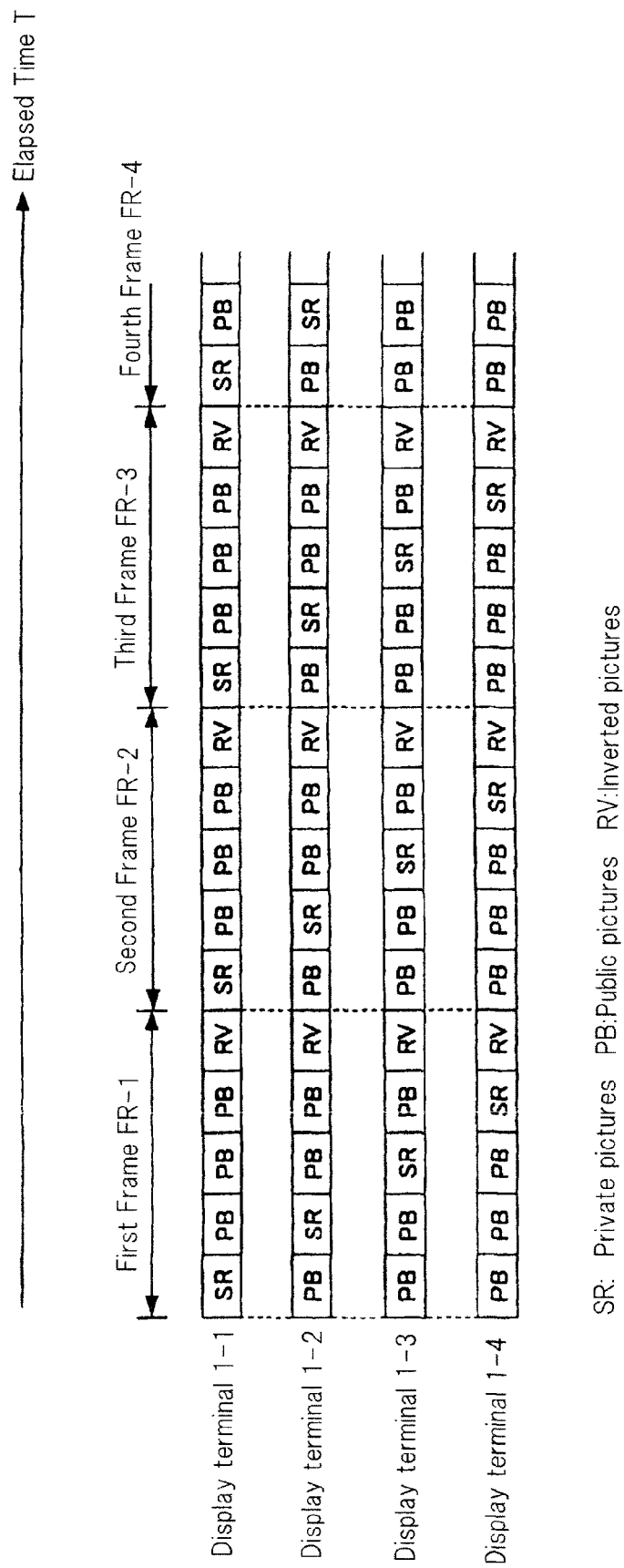
FIG. 3 is a view for describing an example of the exclusive display control of the display system shown in FIG. 2.

An example of exclusive display control is next described with reference to FIG. 3. In FIG. 3, one frame is composed of five subframes.

Each of display terminals 1-1-1-4 displays private pictures SR, inverted pictures RV, and public pictures PB in one frame. However, the display timings of private pictures SR differ in each of display terminals 1-1-1-4.

Inverted pictures RV are pictures for canceling private pictures SR that are displayed within the same frame.

Public pictures PB are pictures that can be viewed by persons who are not wearing optical shutters 2-1-2-4.

As shown in FIG. 3, in the present exemplary embodiment, in one frame (for example, the first frame FR-1), display terminal 1-1 carries out the successive display of private pictures SR, public pictures PB, public pictures PB, public pictures PB, and inverted pictures RV in that order; display terminal 1-2 carries out successive display of public pictures PB, private pictures SR, public pictures PB, public pictures PB, and inverted pictures RV in that order; display terminal 1-3 carries out successive display of public pictures PB, public pictures PB, private pictures SR, public pictures PB, and inverted pictures RV in that order; and display terminal 1-4 carries out successive display of public pictures PB, public pictures PB, public pictures PB, private pictures SR, and inverted pictures RV in that order.

Further, in one frame (for example, in first frame FR-1) the subframes in which public pictures PB are continuous (for example, the second subframe, third subframe, and fourth subframe that are displayed on display terminal 1-1) only require the display of public pictures PB, and rewriting of the pictures therefore does not need to be carried out in subframe units. When the display terminal is a pulse emission display such as a CRT (Cathode Ray Tube) display or an organic EL (Electro-Luminescence) display, rewriting (redrawing) in subframe units is preferable for the purpose of reducing flicker of the picture. On the other hand, when the display terminal is a hold-type display device such as a liquid crystal display, the picture is held once the picture is written. As a result, regarding the second to fourth subframes in which a public picture PB is continuous, once the public picture has been written in the second subframe, the public picture need not be written for the third subframe and fourth subframe. This decrease of the number of instances of writing of a picture can realize a decrease of power consumption.

The frequency of the successive display of the private pictures SR, inverted pictures RV, and public pictures PB shown in FIG. 3 must be set to a degree at which the pictures are perceived to merge over time when a user is viewing the picture. More specifically, the frequency of the frames is at least 60 Hz, and the frequency of subframes in which each of private pictures SR, inverted pictures RV, and public pictures PB are displayed is preferably set to at least 180 Hz.

Optical shutters 2-1-2-4 have a one-to-one correspondence with display terminals 1-1-1-4, and optical shutters 2-1-2-4 turn ON (transmit light) in intervals in which the corresponding display terminal is displaying private pictures SR and otherwise turn OFF (block light). Accordingly, user U1 that is wearing optical shutter 2-1 is able to view through optical shutter 2-1 private pictures SR that are being displayed on display unit 12-1 of display terminal 1-1. Similarly, users U2-U4 are each able to view through optical shutters 2-2-2-4, respectively, that each user is wearing, the private pictures SR that are displayed on display terminals 1-2-1-4, respectively.

In addition, private pictures SR that are displayed in frames on each of display terminals 1-1-1-4 are canceled by inverted pictures RV that are displayed in the frames. As a result, when an outsider views display units 12-1-12-4 of each of display terminals 1-1-1-4 without looking through optical shutters 2-1-2-4, the outsider is unable to see private pictures SR and can discern only public pictures PB.

Private pictures SR and public pictures PB that are displayed on each of display terminals 1-1-1-4 may be the same pictures on all or a portion of display terminals 1-1-1-4 or may differ for each display terminal.

The actual configuration of display terminals 1-1-1-4 is next described in detail. Display terminals 1-1-1-4 include the same configuration, and the following description therefore relates to the configuration of display terminal 1-1 by way of example.

As shown in FIG. 2, display terminal 1-1 includes communication unit 11-1, display unit 12-1, and optical shutter control unit 13-1.

Communication unit 11-1 communicates with display control apparatus 3. For example, communication unit 11-1 receives picture assignment signal ASN from display control apparatus 3. Picture assignment signal ASN is a display timing signal that indicates the timings (timing information) for displaying each of private pictures SR, inverted pictures RV, and public pictures PB in one frame.

Display unit 12-1 switches and displays private pictures SR, inverted pictures RV, and public pictures PB in one frame based on the picture assignment signal ASN that is supplied from communication unit 11-1 as shown in FIG. 3.

Based on picture assignment signal ASN that was received from display control apparatus 3, optical shutter control unit 13-1 transmits a synchronizing signal SYC to optical shutter 2-1. Synchronizing signal SYC is a signal for effecting the ON/OFF control of optical shutter 2-1.

In this example, optical shutter control unit 13-1 transmits a Hi-level synchronizing signal SYC to optical shutter 2-1 during the interval in which display unit 12-1 displays private pictures SR. Optical shutter control unit 13-1 further transmits a Low-level synchronizing signal SYC to optical shutter 2-1 during the interval in which display unit 12-1 displays pictures other than private pictures SR.

Display terminal 1-1 may be constituted by an information processing device in which communication unit 11-1 and optical shutter control unit 13-1 are accommodated in the same case, and display unit 12-1 may be constituted by a display device such as a monitor. In addition, display terminal 1-1 may be constituted by an information processing device in which communication unit 11-1, display unit 12-1, and optical shutter control unit 13-1 are all accommodated in the same case.

As shown in FIG. 2, display terminals 1-2-1-4 each include communication units 11-2-11-4, display units 12-2-12-4, and optical shutter control units 13-2-13-4, respectively, that correspond to communication unit 11-1, display unit 12-1, and optical shutter control unit 13-1, respectively, of display terminal 1-1.

The actual configuration of optical shutters 2-1-2-4 is next described in detail. Optical shutters 2-1-2-4 are of the same configuration, and the following explanation therefore takes the configuration of optical shutter 2-1 as an example.

Optical shutter 2-1 includes a communication unit (not shown) and a shutter mechanism (not shown).

Optical shutter 2-1 receives synchronizing signal SYC from display terminal 1-1. When synchronizing signal SYC received from display terminal 1-1 is Hi-level, optical shutter 2-1 enters the ON (open) state, and when the synchronizing signal SYC received from display terminal 1-1 is Low-level, optical shutter 2-1 enters the OFF (closed) state. By means of this operation, the display timing of private pictures SR on display terminal 1-1 and the ON/OFF (open/closed) timing of optical shutter 2-1 are in a synchronized state. In intervals in which private pictures SR are displayed, optical shutter 2-1 enters the ON state, and in intervals in which pictures other than private pictures SR are displayed, optical shutter 2-1 enters the OFF state.

In the above-described operation of optical shutter 2-1, the logic of synchronizing signal SYC and the logic of open and closed shutter may also be reversed. In other words, the shutter may turn OFF when synchronizing signal SYC is Hi-level and the shutter may turn ON when synchronizing signal SYC is Low-level. Synchronizing signal SYC may also be encrypted. Encrypting synchronizing signal SYC enables the prevention of interception of the display timing by someone other than the user of the display terminal.

As described hereinabove, display terminals 1-1-1-4 switch and display a plurality of pictures in one frame at high speed. When high-speed picture switching is carried out, only private pictures SR are supposed to be visible when viewed through an optical shutter when switching is effected from public pictures PB to private pictures SR, but crosstalk of pictures may occur in which the public picture PB that was displayed one subframe previously in time remains visible. In order to avoid this crosstalk of pictures, optical shutters 2-1-2-4 are preferably optical shutters that can open and close at high speed.

Optical shutters 2-1-2-4 may, for example, be mechanical shutters that open and close mechanically. Alternatively, optical shutters 2-1-2-4 may be liquid crystal shutters in which liquid crystal is interposed between two oppositely arranged sheet polarizers and that open and close by the control of the voltage that is applied to liquid crystal. The types of liquid crystal that can be applied in a liquid crystal shutter include TN (Twisted Nematic) liquid crystal, VA (Vertical Alignment) liquid crystal, IPS (In-Plane Switching) liquid crystal, and OCB (Optically Compensated Bend) liquid crystal. Optical shutters 2-1-2-4 may also be liquid crystal shutters that employ a ferroelectric liquid crystal or an antiferroelectric liquid crystal as the liquid crystal. Such liquid crystal shutters are superior for high-speed operation.

The communication method used in the transmission of synchronizing signals SYC from display terminals 1-1-1-4 to optical shutters 2-1-2-4 may be a wired communication method or a wireless communication method. However, when a wireless communication method is used to transmit synchronizing signals SYC, the frequency bands of the carrier waves are preferably separated to exclusively set mutual synchronizing signals SYC channels such that interference does not occur between synchronizing signals SYC that are transmitted from the plurality of display terminals.

The channels to which synchronizing signals SYC transmitted by display terminals 1-1-1-4 to optical shutters 2-1-2-4 are assigned may be controlled by display control apparatus 3. In this case, display control apparatus 3 transmits to display terminals 1-1-1-4 picture assignment signals ASN to which information is appended that indicates each of the channels to which synchronizing signals SYC are assigned that are to be transmitted to optical shutters 2-1-2-4.

In order to avoid interference, ID (identification information) for individually identifying the sets of the correspondences between display terminals 1-1-1-4 and optical shutters 2-1-2-4 may be assigned in advance, and these ID may be appended to, for example, the headers of the synchronizing signals SYC. In this case, when optical shutters 2-1-2-4 receive synchronizing signals SYC, each of optical shutters 2-1-2-4 distinguishes the destination of the synchronizing signals SYC that were received based on the ID and implements ON/OFF operation based on the synchronizing signal SYC that is addressed to itself. In this way, interference among the synchronizing signals SYC of optical shutters 2-1-2-4 can be avoided. In this case, display terminals 1-1-1-4 are able to use a carrier wave of the same frequency to transmit synchronizing signals SYC.

Display control apparatus 3 is next described.

Display control apparatus 3 identifies each of display terminals 1-1-1-4 and transmits to display terminals 1-1-1-4 picture assignment signals ASN that contain display timings such that the display timings of private pictures SR displayed on each of display terminals 1-1-1-4 are mutually exclusive.

Display control apparatus 3 may be, for example, a personal computer, a server, or a relay device that functions as wireless LAN access point. In addition, display control apparatus 3 is not limited to a device constituted in a separate housing from display terminals 1-1-1-4 shown in FIG. 2. For example, any one of display terminals 1-1-1-4 may be equipped with the capabilities of display control apparatus 3.

As shown in FIG. 2, display control apparatus 3 includes communication unit 31 and display control unit 32. Display control unit 32 generates picture assignment signals ASN that are to be transmitted to each of display terminals 1-1-1-4. Each of the picture assignment signals ASN to display terminals 1-1-1-4 are supplied to communication unit 31 from display control unit 32.

Communication unit 31 transmits and receives information with each of display terminals 1-1-1-4. For example, communication unit 31 transmits to each of display terminals 1-1-1-4 each of the picture assignment signals ASN that are supplied from display control unit 32. In addition, the following methods can be considered as the methods by which communication unit 31 transmits picture assignment signals ASN to display terminals 1-1-1-4.

For example, communication unit 31 may transmit to each of display terminals 1-1-1-4 picture assignment signals ASN immediately before the display of the picture of the first subframe for each frame or for each predetermined number of frames. Alternatively, communication unit 31 may transmit picture assignment signals ASN to display terminals 1-1-1-4 just one time at the time that display terminals 1-1-1-4 connect to display control apparatus 3.

As will be described hereinbelow, when the assignments of the display timings of private pictures SR, public pictures PB, and inverted pictures RV for each frame are to be altered, communication unit 31 preferably transmits picture assignment signals ASN for each frame. In addition, communication unit 31 may successively transmit the picture assignment signals ASN to corresponding display terminals for each timing of the switching of pictures (for example, the timing of switching from private pictures SR to public pictures PB, the timing of switching from public pictures PB to inverted pictures RV, or the timing of switching from inverted pictures RV to private pictures SR).

Figure 4:
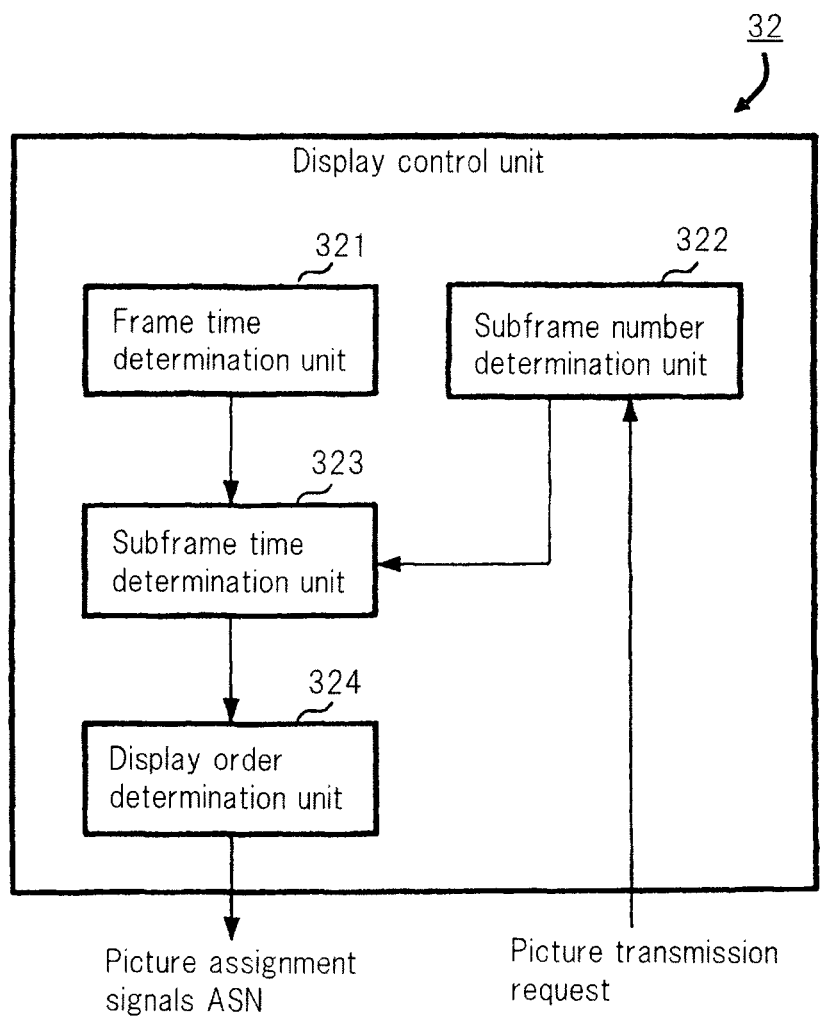
FIG. 4 is a block diagram showing the configuration of the display control unit of the display system shown in FIG. 2.

FIG. 4 shows the configuration of display control unit 32. Display control unit 32 includes frame time determination unit 321, subframe number determination unit 322, subframe time determination unit 323, and display order determination unit 324.

Frame time determination unit 321 is a period determination unit that determines the time of one frame in each of display terminals 1-1-1-4. Frame time determination unit 321 determines the time of frames that contain the display of private pictures SR, public pictures PB, and inverted pictures RV for each of display terminals 1-1-1-4 and supplies the frame times to subframe time determination unit 323.

Subframe number determination unit 322 is a sub-period number determination unit that determines the number of subframes into which one frame is divided.

Subframe number determination unit 322 detects the terminal number that is the number of display terminals 1-1-1-4 that are currently connected to display control apparatus 3, and based on the number of terminals that was detected, determines the number of subframes and supplies this number of subframes to subframe time determination unit 323.

For example, display terminals 1-1-1-4 sends a picture transmission request to display control apparatus 3 to request the transmission of picture assignment signals ASN. The picture transmission request contains information (terminal identification information) that can identify the display terminal that is the origin of the request. In display control apparatus 3, each of the picture transmission requests of display terminals 1-1-1-4 are supplied to subframe number determination unit 322. Based on the terminal identification information of the picture transmission request that was received, subframe number determination unit 322 detects the number of display terminals that are connected to display control apparatus 3.

Subframe number determination unit 322 next, based on the number of terminals that was detected, calculates the number of subframes in one frame. For example, if the number of terminals is four, at least four subframes are necessary to exclusively display private pictures SR among the four display terminals. In addition, at least one subframe is necessary for displaying inverted pictures RV in one frame. Accordingly, subframe number determination unit 322 here determines that the number of subframes in one frame is five.

Subframe time determination unit 323 is a sub-period determination unit. Subframe time determination unit 323 determines the times of subframes (corresponding to the display intervals of each of private pictures SR, public pictures PB, and inverted pictures RV) based on the frame time that was supplied as output from frame time determination unit 321 and the number of subframes that was supplied as output from subframe number determination unit 322. More specifically, subframe time determination unit 323 divides the time of a frame that was supplied as output from frame time determination unit 321 by the number of subframes that was supplied as output from subframe number determination unit 322 to determine the result of division as the subframe time. The subframe time that has been determined in this way is supplied from subframe number determination unit 322 to display order determination unit 324.

Display order determination unit 324 refers to the subframe time that was supplied as output from subframe time determination unit 323 to determine the pictures (which of private pictures SR, inverted pictures RV, and public pictures PB) to assign for each subframe for each of display terminals 1-1-1-4. In other words, display order determination unit 324 determines the display order of private pictures SR, inverted pictures RV, and public pictures PB in one frame for each of display terminals 1-1-1-4.

Relating to the determination of the display order of pictures, display order determination unit 324 both makes the display order of pictures identical for each frame for each of display terminals 1-1-1-4 and, in intervals in which any of the display terminals among display terminals 1-1-1-4 displays private pictures SR, makes the other display terminals display pictures other than private pictures SR. More specifically, in display terminal 1-1, pictures in each frame are displayed in the order: private pictures SR, public pictures PB, public pictures PB, public pictures PB, and cancelling pictures RV. In contrast, in display terminal 1-2, pictures in each frame are displayed in the order: public pictures PB, private pictures SR, public pictures PB, public pictures PB, and inverted pictures RV. As previously explained, the important point here is that exclusive display control is implemented such that the position (order) of subframes in which private pictures SR are displayed in a frame differs between display terminals 1-1 and 1-2.

In addition, display order determination unit 324 generates for each of display terminals 1-1-1-4 picture assignment signals ASN that indicate the display order of pictures that was determined and supplies the picture assignment signals ASN as output to communication unit 31.

The synchronizing signals SYC that are transmitted to optical shutters 2-1-2-4 from display terminals 1-1-1-4 are signals that indicate the timings at which private pictures SR are to be displayed and contains information of substantially the same content as the information contained by picture assignment signals ASN. As a result, display control apparatus 3 may both transmit picture assignment signals ASN to display terminals 1-1-1-4 and directly transmit picture assignment signals ASN to optical shutters 2-1-2-4 in place of synchronizing signals SYC.

According to the present exemplary embodiment, each of optical shutters 2-1-2-4 enters the ON state only in the interval in which the corresponding display terminal of display terminals 1-1-1-4 is displaying private pictures SR and is in the OFF state in intervals in which the corresponding display terminal is displaying pictures other than private pictures SR (inverted pictures RV or public pictures PB).

Accordingly, for example, user U1 who is wearing optical shutter 2-1 is able to view the private pictures SR that are being displayed on display unit 12-1 through optical shutter 2-1.

In addition, in the interval in which optical shutter 2-1 is in the ON state (the interval in which display terminal 1-1 is displaying private pictures SR), display terminals 1-2-1-4 are displaying pictures other than private pictures SR (public pictures PB). Accordingly, when user U1 that is wearing optical shutter 2-1 looks at display terminals 1-2-1-4, user U1 perceives public pictures PB that are being displayed on display terminals 1-2-1-4 through optical shutter 2-1. In other words, user U1 who is wearing optical shutter 2-1 is unable to see private pictures SR that are displayed on each of display terminals 1-2-1-4.

Further, the timings of the picture display of display terminals 1-1-1-4 are synchronized, and in the interval in each frame in which display terminal 1-1 is displaying private pictures SR (the interval in which optical shutter 2-1 is in the ON state), public pictures PB are always being displayed on display terminals 1-2-1-4. Accordingly, when user U1 is looking at private pictures SR that are being displayed on display terminal 1-1 through optical shutter 2-1, flicker will not be produced in the display of the public pictures PB even if public pictures PB that are being displayed on any of display terminals 1-2-1-4 enter the user's field of view.

Similar to the example of user U1, users U2-U4 of display terminals 1-2-1-4 are able to view private pictures SR that are being displayed on the display terminals that each user is using, but users U2-U4 are unable to perceive private pictures SR that are being displayed on display terminals other than the display terminal that each user is using, and further, flicker does not occur.

Because a plurality of different pictures are displayed in time divisions in one frame in the display system of the present exemplary embodiment, the frame frequency is preferably set to at least 60 Hz in order to suppress flicker when persons not wearing optical shutters 2-1-2-4 view pictures that are being displayed on each display unit of display terminals 1-1-1-4.

In the exclusive display control, moreover, the order of pictures that are assigned to subframes is not limited to the order shown in FIG. 3. For example, although inverted pictures RV are displayed in all of display terminals 1-1-1-4 in the fifth subframe in each frame in FIG. 3, the subframe in which inverted pictures RV are displayed may be a subframe other than the fifth subframe.

In addition, in the picture display order shown in FIG. 3, display control apparatus 3 may both cause the display of pictures on display terminal 1-1 in the order of: public pictures PB, public pictures PB, private pictures SR, public pictures PB, and inverted pictures RV and cause the display of pictures on display terminal 1-3 in the order of: private pictures SR, public pictures PB, public pictures PB, public pictures PB, and inverted pictures RV. In this case as well, the exclusive display control of private pictures SR can also be implemented among display terminals 1-2-1-4.

Essentially, the order of display of pictures on display terminals 1-1-1-4 need only be an order such that a user is unable to perceive through optical shutters private pictures SR or inverted pictures RV that are being displayed on display terminals other than the display terminal that the user is using. As a result, in intervals in which, for example, optical shutter 2-1 that is connected to display terminal 1-1 is in the ON state, private pictures SR are preferably not displayed on display terminals 1-2-1-4.

In interval in which display terminal 1-1 is displaying private pictures SR, optical shutter 2-1 is in the ON state, and as a result, when at least one of display terminals 1-2-1-4 (for example, display terminal 1-2) displays private pictures SR in this interval, user U1 of display terminal 1-1 is able to perceive private pictures SR that are being displayed by display terminal 1-2 through optical shutter 2-1. Still further, in an interval in which display terminal 1-2 is displaying private pictures SR, optical shutter 2-2 is also in the ON state. As a result, user U2 of display terminal 1-2 is also able to perceive private pictures SR that are being displayed by display terminal 1-1. According to the present exemplary embodiment, the display intervals of private pictures SR of each of display terminals 1-1-1-4 are different, whereby users that are wearing optical shutters are unable to perceive private pictures SR that are being displayed on display terminals other than the display terminals that each user is using.

Inverted pictures RV are pictures for cancelling the content of private pictures SR and are pictures having high correlation with private pictures SR. As a result, in order to avoid divulging the content of inverted pictures RV to other persons, the display intervals of inverted pictures RV among display terminals 1-1-1-4 are preferably made different from the display intervals of private pictures SR on other display terminals. As a result, when, for example, user U1 is looking at private pictures SR that are being displayed on display terminal 1-1 through optical shutter 2-1, the display of inverted pictures RV by other display terminals 1-2-1-4 can be avoided in intervals in which optical shutter 2-1 is in the ON state.

In intervals in which any of display terminals 1-1-1-4 is displaying private pictures SR, the remaining display terminals display, for example, pictures having content with no correlation (or with low correlation) to private pictures SR such as public pictures PB or monochrome pictures in which gradation (for example black levels) is uniform.

Alternatively, in intervals in which any of display terminals 1-1-1-4 is displaying private pictures SR, the remaining display terminals may display no pictures. In this case, if, for example, the display terminal is a liquid crystal display, the backlight may be turned OFF as the process for not displaying pictures.

Second Exemplary Embodiment

Figure 6:
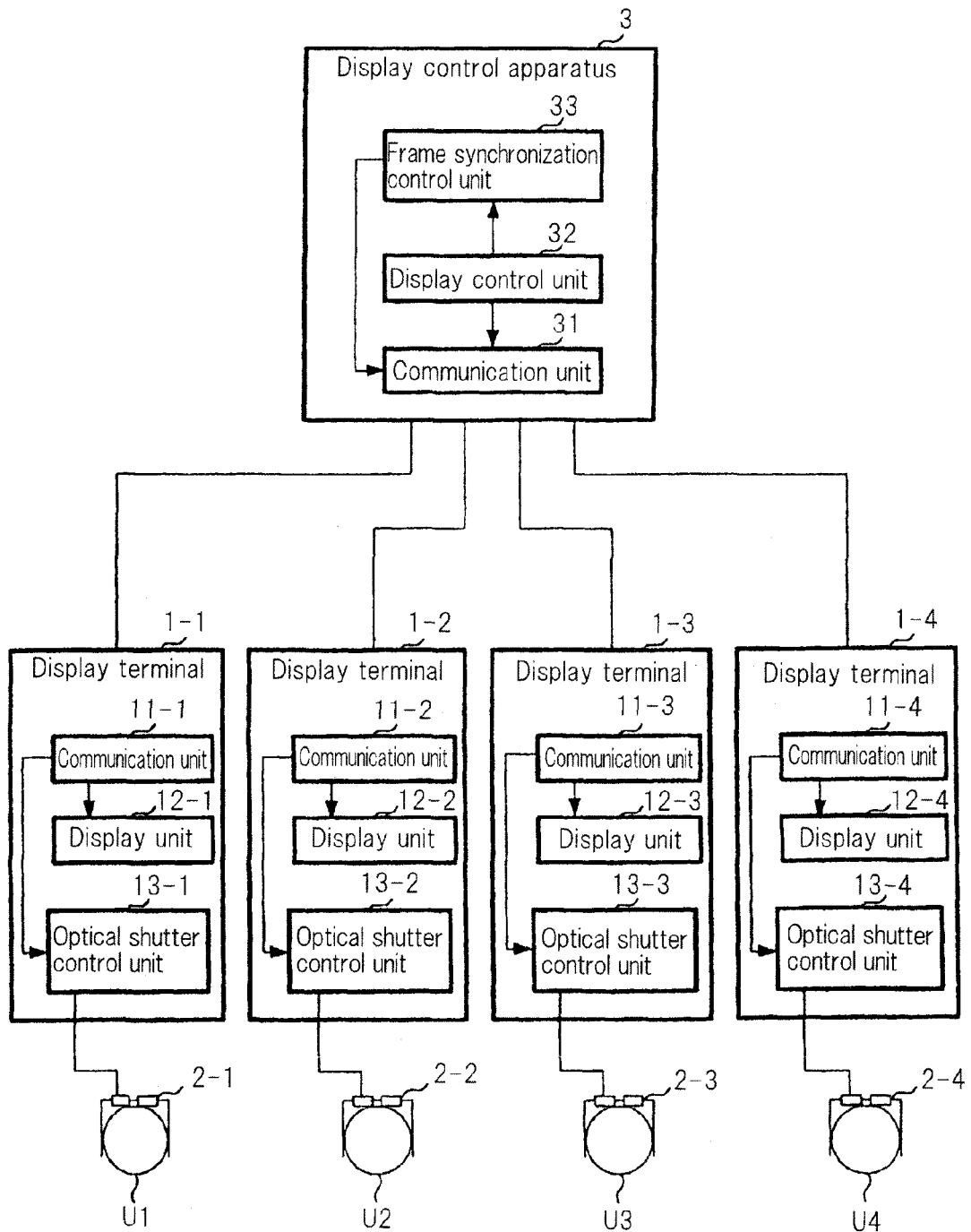
FIG. 6 is a block diagram showing the configuration of the display system that is the second exemplary embodiment of the present invention.

FIG. 6 is a block diagram showing the configuration of the display system that is the second exemplary embodiment of the present invention.

In the display system of the present exemplary embodiment, display control apparatus 3 includes frame synchronization control unit 33, this point being the difference with respect to the display system of the first exemplary embodiment.

Upon receiving picture assignment signals ASN from display control apparatus 3, display terminals 1-1-1-4 quickly switch and display pictures at the display timing shown in FIG. 3. The picture display timing (or the timings of switching pictures) among display terminals 1-1-1-4 must match accurately.

In order to realize accurate matching of the timing of picture display among display terminals 1-1-1-4, it is crucial that delay time of the communication channel used in transmitting picture assignment signals ASN be limited.

For example, when the delay time when picture assignment signal ASN is transmitted from display control apparatus 3 to display terminal 1-1 differs from the delay time when picture assignment signal ASN is transmitted from display control apparatus 3 to display terminal 1-2, the display timing of display terminal 1-1 will diverge from the display timing of display terminal 1-2. As a result, when user U1 looks at display unit 12-2 of display terminal 1-2 through optical shutter 2-1, private pictures SR or inverted pictures RV may partially intrude in the display.

Alternatively, the delay time of each communication channel that is used in the transmission of picture assignment signals ASN between display control apparatus 3 and display terminals 1-1-1-4 may vary for each frame. In such cases, when a user looks at the display terminal of another user through the optical shutter, public pictures PB may be visible in some frames, but in other frames, pictures in which private pictures SR or inverted pictures RV are mixed with public pictures PB may be visible. Such mixed pictures are perceived as flicker.

To avoid such conditions as described above, the display timing of pictures among display terminals 1-1-1-4 must coincide with each other.

In order to reduce delay, the communication channel used in the transmission of picture assignment signals ASN from display control apparatus 3 to display terminals 1-1-1-4 is preferably a connection channel having as little delay as possible such as a USB cable or exclusive line or a connection channel in which data arrives at all display terminals with the same delay time and not a communication channel such as a LAN cable (network cable) in which data (including signals other than picture assignment signals ASN) are flowing irregularly.

Figure 5:
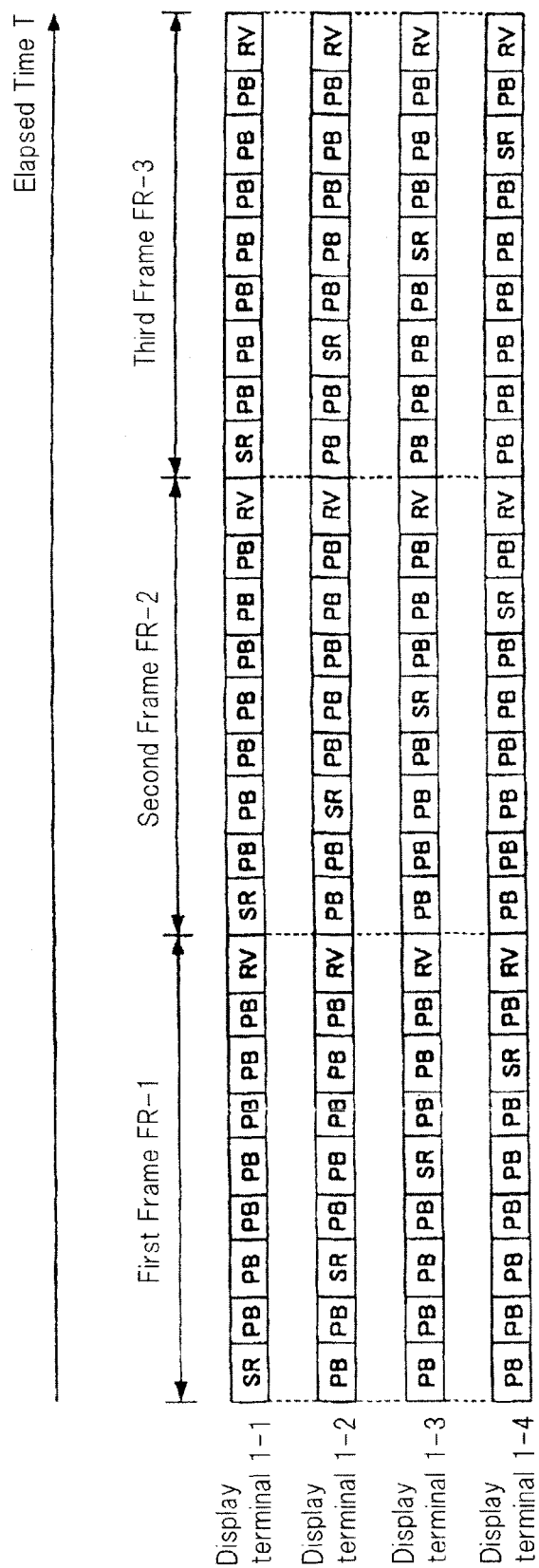
FIG. 5 is a view for describing an example of the exclusive display control of the display system that is the second exemplary embodiment of the present invention.

As a method of achieving mutual matching of the display timings of pictures among display terminals 1-1-1-4, display order determination unit 324 may, as shown in FIG. 5, insert intervals in which all display terminals 1-1-1-4 display public pictures PB between two consecutive subframes shown in FIG. 3. In this way, the timing margin can be increased to the degree of the inserted intervals in which public pictures PB are displayed and flicker can be suppressed even when the timing of receiving picture assignment signals ASN that are transmitted in from display control apparatus 3 differs for each of display terminals 1-1-1-4.

The configuration of the display system of the present exemplary embodiment is next described while referring to FIG. 6.

Frame synchronization control unit 33 is a period synchronizing unit. Frame synchronization control unit 33 transmits frame synchronizing signals that indicate the head of frames (signals that differ from picture assignment signals ASN) to all display terminals 1-1-1-4 all at once. The frame synchronizing signals are period-synchronizing signals.

Display control unit 32 both transmits picture assignment signals ASN in advance to display terminals 1-1-1-4 through communication unit 31 and reports to frame synchronization control unit 33 that picture assignment signals ASN have been transmitted.

When notification that picture assignment signals ASN have been transmitted is communicated from display control unit 32 to frame synchronization control unit 33, frame synchronization control unit 33 transmits frame synchronizing signals to all display terminals 1-1-1-4 all at once. Broadcast that employs wireless communication is suitable for this simultaneous transmission of frame synchronizing signals.

Upon receiving the frame synchronizing signals, display terminals 1-1-1-4 immediately (or after the passage of a predetermined time) begin to successively display subframes based on the picture assignment signals ASN that were already received.

Due to broadcast that employs wireless communication, the timings of reception in display terminals 1-1-1-4 of the frame synchronizing signals that were transmitted all together can be caused to substantially coincide. Accordingly, even when divergence due to delay should occur among display terminals 1-1-1-4 in the timings of the reception of picture assignment signals ASN that were transmitted before the frame synchronizing signals, each of display terminals 1-1-1-4 simultaneously begins the display of subframes based on the frame synchronizing signals, and the display timings of pictures in display terminals 1-1-1-4 can therefore be caused to coincide accurately.

In addition, as another method of achieving coincidence of the display timings at which each of display terminals 1-1-1-4 display pictures, display control apparatus 3 and display terminals 1-1-1-4 may have a clock function (clock unit) and may thus use time information that is measured by each of display terminals 1-1-1-4 to synchronize each of the display timings.

In the case described hereinabove, information processing devices having a clock function such as typical PCs may be applied as display terminals 1-1-1-4.

Because the subframe rate in the present invention is several hundred Hz, the times that are measured by the clock functions of display terminals 1-1-1-4 may not necessarily match each other on the msec level.

As a result, display control apparatus 3 acquires from each of display terminals 1-1-1-4 time information that indicates the time that is measured by each of the clock functions of display terminals 1-1-1-4. Display control apparatus 3 calculates the time differences (delay or advance) between the time that its own clock function is measuring and the times acquired from each of display terminals 1-1-1-4. Display control apparatus 3 then, for each of display terminals 1-1-1-4, refers to the calculated time difference to find a frame start time according to the time that is measured by the clock function of the relevant display terminal, and transmits to that display terminal a picture assignment signal ASN that includes the time that was found and the display timings of each of private pictures SR, inverted pictures RV, and public pictures PB in that frame.

Display terminals 1-1-1-4 display private pictures SR, inverted pictures RV, and public pictures PB in time divisions in frames according to the times and picture assignment that are contained in the picture assignment signals ASN that were transmitted in from display control apparatus 3. In this way, even when the times measured by the clocks of display terminals 1-1-1-4 do not match each other, the display timings of all display terminals 1-1-1-4 can be synchronized and exclusive display control that is free of flicker can be realized.

As another method of synchronizing the time that is measured by the clock belonging to display control apparatus 3 and the times that are measured by the clocks belonging to display terminals 1-1-1-4, a method may be used in which the clock belonging to display control apparatus 3 and the clocks belonging to display terminals 1-1-1-4 are synchronized to time that is distributed from a typical NTP (Network Time Protocol) server (not shown).

According to the present exemplary embodiment as described hereinabove, flicker can be suppressed even when the timings of reception of picture assignment signals ASN that have been transmitted in from display control apparatus 3 diverge from each other for each of display terminals 1-1-1-4.

Third Exemplary Embodiment

The display system that is the third exemplary embodiment of the present invention is next described.

The picture assignment signals ASN that were described hereinabove are signals that include the display timings at which each of display terminals 1-1-1-4 display private pictures SR, inverted pictures RV, and public pictures PB. As a result, when, for example, display terminal 1-1 intercepts the picture assignment signal ASN that was sent to display terminal 1-2, the picture display timing of display terminal 1-2 becomes known to user U1 of display terminal 1-1.

If, based on picture assignment signal ASN for display terminal 1-2 that was intercepted, optical shutter 2-1 is unlawfully converted to perform ON/OFF operation synchronized with the timing at which display terminal 1-2 displays private pictures SR, user U1 is able to learn the content of the private pictures of display terminal 1-2. Still further, it is difficult for user U2 of display terminal 1-2 to perceive that picture assignment signal ASN for display terminal 1-2 has been intercepted by user U1.

By encrypting and then transmitting picture assignment signals ASN, the divulging of the display timings of private pictures SR can be avoided even when picture assignment signals ASN are intercepted by an outside party.

The display system of the present exemplary embodiment is a system in which a construction that encrypts and transmits picture assignment signals ASN has been added to the system of the first exemplary embodiment. The configuration of the display system of the present exemplary embodiment is next described concretely. Because display terminals 1-1-1-4 have the same configuration, the following explanation will take the configuration of display terminals 1-1-1-2 as an example.

Figure 7:
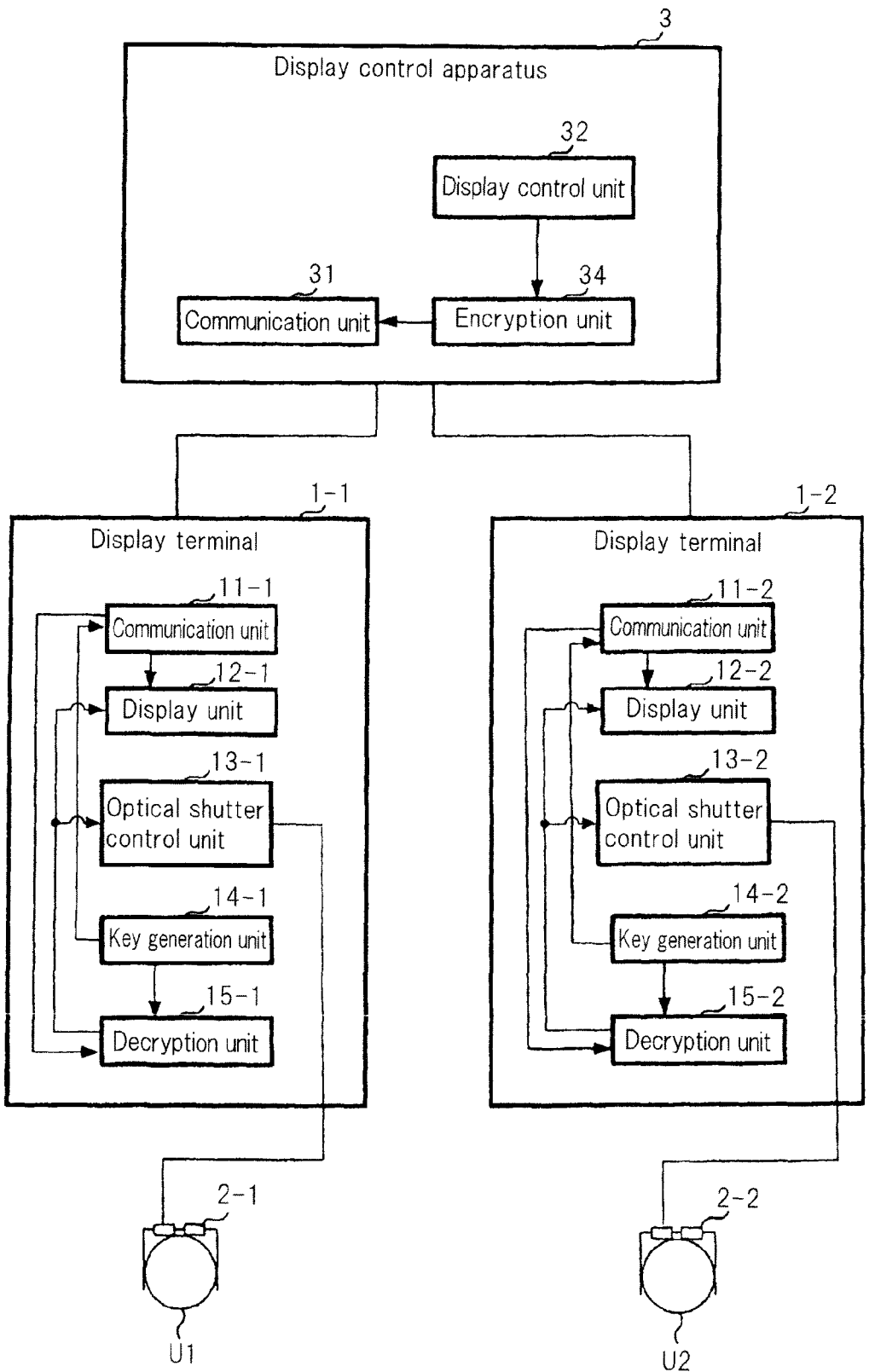
FIG. 7 is a block diagram showing the configuration of the display system that is the third exemplary embodiment of the present invention.

As shown in FIG. 7, display terminal 1-1 includes key generation unit 14-1 and decryption unit 15-1 in addition to communication unit 11-1, display unit 12-1, and optical shutter control unit 13-1. Display terminal 1-2 includes key generation unit 14-2 and decryption unit 15-2 in addition to communication unit 11-2, display unit 12-2, and optical shutter control unit 13-2.

Key generation unit 14-1 generates encryption key (public key) EK1 and decryption key (private key) DK1 that are unique to display terminal 1-1. Encryption key EK1 is transmitted in advance to display control apparatus 3 via communication unit 11-1, and decryption key DK1 is supplied to decryption unit 15-1.

Key generation unit 14-2 generates encryption key (public key) EK2 and decryption key (private key) DK2 that are unique to display terminal 1-2. Encryption key EK2 is transmitted in advance to display control apparatus 3 via communication unit 11-2, and decryption key DK2 is supplied to decryption unit 15-2.

Display control apparatus 3 includes encryption unit 34 in addition to communication unit 31 and display control unit 32. Display control unit 32 generates each of picture assignment signal ASN for use by display terminal 1-1 and picture assignment signal ASN for use by display terminal 1-2. These picture assignment signals ASN are supplied to encryption unit 34.

Encryption unit 34 holds encryption key EK1 that was generated in key generation unit 14-1 and encryption key EK2 that was generated in key generation unit 14-2. Encryption unit 34 both encrypts picture assignment signal ASN for use by display terminal 1-1 using encryption key EK1 and encrypts picture assignment signal ASN for use by display terminal 1-2 using encryption key EK2.

Picture assignment signal ASN for use by display terminal 1-1 that has been encrypted is transmitted to display terminal 1-1 via communication unit 31. Picture assignment signal ASN for use by display terminal 1-2 that has been encrypted is transmitted to display terminal 1-2 via communication unit 31.

In display terminal 1-1, communication unit 11-1 receives picture assignment signal ASN for use by display terminal 1-1 that has been encrypted and that was transmitted from display control apparatus 3 and supplies the picture assignment signal ASN that was received to decryption unit 15-1. With decryption key DK1 that was generated in key generation unit 14-1, decryption unit 15-1 decrypts picture assignment signal ASN for use by display terminal 1-1 that was encrypted. Decryption unit 15-1 supplies the picture assignment signal ASN that has been decrypted to optical shutter control unit 13-1 and display unit 12-1.

Based on picture assignment signal ASN that has been decrypted, display unit 12-1 displays private pictures SR, public pictures PB, and inverted pictures RV in one frame. Based on picture assignment signal ASN that was decrypted, optical shutter control unit 13-1 generates synchronizing signal SYC for controlling optical shutter 2-1.

In display terminal 1-2, communication unit 11-2 receives picture assignment signal ASN for use by display terminal 1-2 that has been encrypted and that was transmitted from display control apparatus 3 and supplies picture assignment signal ASN that was received to decryption unit 15-2. With decryption key DK1 that was generated in key generation unit 14-2, decryption unit 15-2 decrypts picture assignment signal ASN for use by display terminal 1-2 that was encrypted. Decryption unit 15-2 supplies picture assignment signal ASN that has been decrypted to optical shutter control unit 13-2 and display unit 12-2.

Based on picture assignment signal ASN that has been decrypted, display unit 12-2 displays private pictures SR, public pictures PB, and inverted pictures RV in one frame. Based on picture assignment signal ASN that has been decrypted, optical shutter control unit 13-2 generates synchronizing signal SYC for controlling optical shutter 2-2.

According to the configuration shown in FIG. 7, picture assignment signals ASN are encrypted by encryption keys that are unique to each of display terminal 1-1 and 1-2, whereby the divulgation of display timings of pictures can be guarded against even when picture assignment signals ASN are intercepted by display terminals other than display terminals 1-1 and 1-2 or third persons other than users U1 and U2.

Synchronizing signals SYC include information of substantially the same content as the information contained by picture assignment signals ASN. For this reason, if synchronizing signals SYC are intercepted by, for example, a user who intends to unlawfully use either of display terminals 1-1 and 1-2 to surreptitiously view private pictures SR that are displayed on another display terminal, the danger arises that private pictures SR will be divulged.

In order to avoid the unauthorized viewing of private pictures SR through the unauthorized use of intercepted synchronizing signals SYC, optical shutter control unit 13-1 preferably uses the encryption key that was generated by key generation unit 14-1 to generate synchronizing signal SYC for controlling optical shutter 2-1, similar to a case of encrypting and transmitting picture assignment signals ASN. Similarly, optical shutter control unit 13-2 preferably uses the encryption key that was generated by key generation unit 14-2 to generate synchronizing signal SYC for controlling optical shutter 2-2.

Although explanation was omitted, display terminals 1-3 and 1-4 are of the same configuration as display terminal 1-1.

Fourth Exemplary Embodiment

The display system that is the fourth exemplary embodiment of the present invention is next described.

In the display system of the first exemplary embodiment, display terminals 1-1-1-4 displayed private pictures SR, inverted pictures RV, and public pictures PB at relatively identical display timings (in the order of subframes) in each frame, as shown in FIG. 3. Consequently, if a user of any of the display terminals of display terminals 1-1-1-4 knows that display terminals 1-1-1-4 display private pictures SR, inverted pictures RV, and public pictures PB at relatively identical timings in each frame, such a user would be able to predict the timings of display in other display terminals based on picture assignment signals ASN that have been transmitted in to the display terminal that this user is using.

Figure 8:
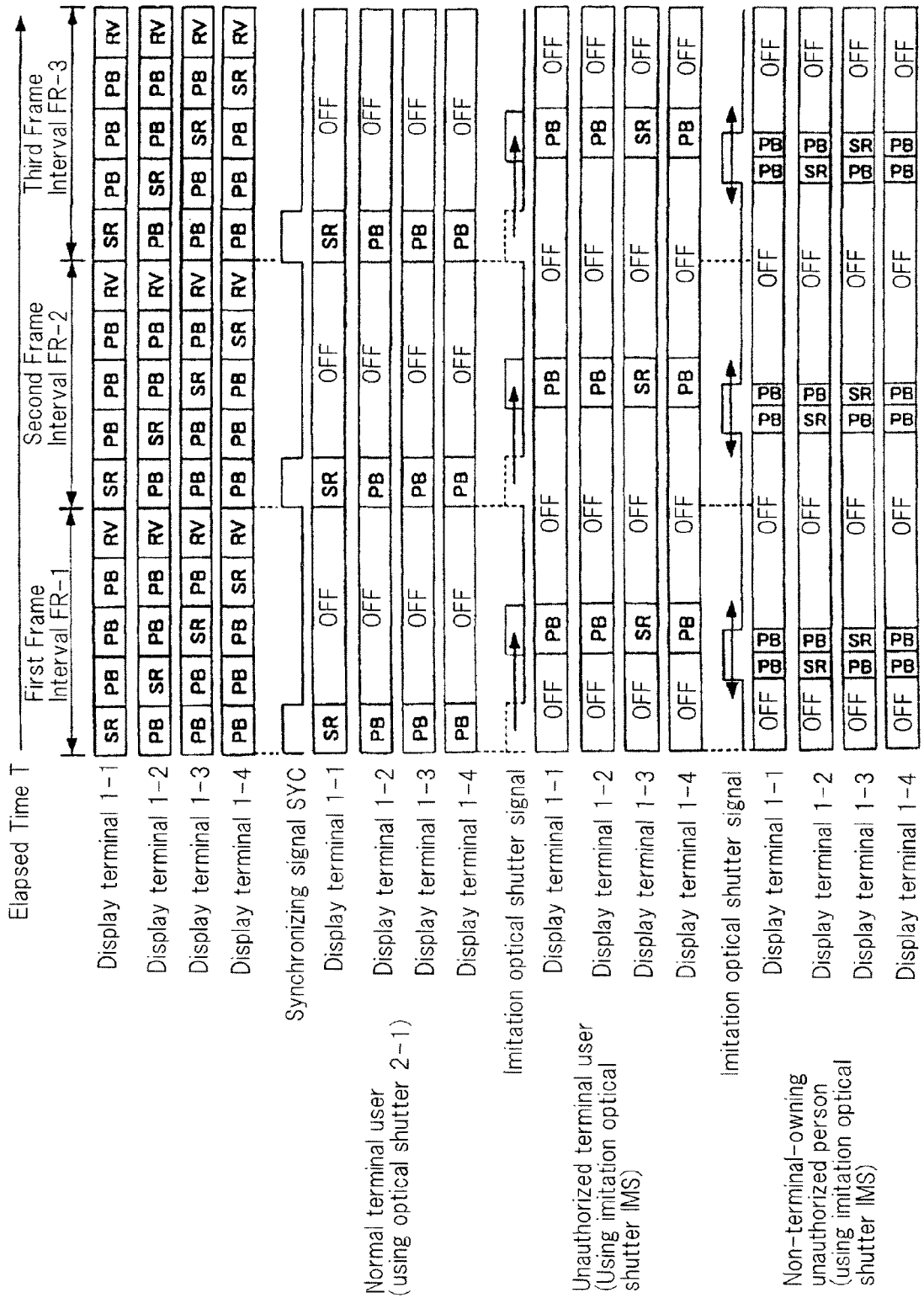
FIG. 8 is a view for describing an unauthorized act realized by the imitation optical shutter regarding the operation of each display terminal in the exclusive display control of the display system shown in FIG. 2.

FIG. 8 shows, in the exclusive display control shown in FIG. 3, pictures when display terminals 1-1-1-4 are viewed by users (hereinbelow referred to as "normal terminal users") who are properly using picture assignment signals ASN that are received by display terminals, and pictures when display terminals 1-1-1-4 are viewed by a person who intends to unlawfully view private pictures SR that are displayed on a display terminal other than the display terminal that he or she is using.

Picture assignment signal ASN that is transmitted in to display terminal 1-1 includes, for example, information indicating that private pictures SR are to be displayed in the first subframe and inverted pictures RV are to be displayed in the fifth subframe. Thus, based on picture assignment signal ASN that is transmitted in to display terminal 1-1, user U1 of display terminal 1-1 is able to predict that display terminals 1-2-1-4 will display private pictures SR in one of the second to fourth subframes.

In other words, user U1, based on the display timings that are contained in picture assignment signal ASN that has been transmitted in to display terminal 1-1, is able to unlawfully view the private pictures SR that are displayed on display terminals 1-2-1-4 if he or she adjusts the frequency and phase of an optical shutter (hereinbelow referred to as imitation optical shutter IMS) that is set to enter the ON state in a subframe (for example, the second subframe) other than the subframe (first subframe) in which display terminal 1-1 displays private pictures SR In the example shown in FIG. 8, moreover, the subframes to which private pictures SR are assigned are display timings that are relatively identical for each frame. As a result, once the frequency of imitation optical shutter IMS has been set such that private pictures SR of other display terminals can be seen, private pictures SR that these other display terminals display in subsequent frames can also be seen.

The user that uses any of display terminals 1-1-1-4 is able to unlawfully view private pictures SR that are displayed on other display terminals using the imitation optical shutter IMS that has been set based on the display timings indicated by picture assignment signal ASN that is transmitted in to the display terminal that he or she is using.

In the following explanation, the term "unauthorized terminal user" applies to a user who, based on the display timings indicated by picture assignment signals ASN that were transmitted in to the display terminal that he or she is using, unlawfully views private pictures SR that are displayed on other display terminals by using imitation optical shutter IMS.

A case is next considered that assumes the existence of an unauthorized third person (hereinbelow referred to as non-terminal-owning unauthorized person) who has only an imitation optical shutter IMS capable of altering the frequency and phase of the opening and closing of shutters and who does not own (use) display terminals 1-1-1-4 that can receive picture assignment signals ASN.

When the frame frequency of pictures that are displayed on display terminals 1-1-1-4 is fixed, a non-terminal-owning unauthorized person is able to set the frequency or phase of the signal that effects ON/OFF control of imitation optical shutter IMS to the same values as the frame frequency or phase of private pictures SR that are displayed on display terminals 1-1-1-4. In this case, unauthorized viewing of private pictures SR that are displayed on display terminals 1-1-1-4 becomes possible.

When the frame frequency is fixed in the display system of the present exemplary embodiment, exclusive display control is implemented that guards against unauthorized viewing of private pictures SR by imitation optical shutter IMS. This exclusive display control method is next described.

Figure 9:
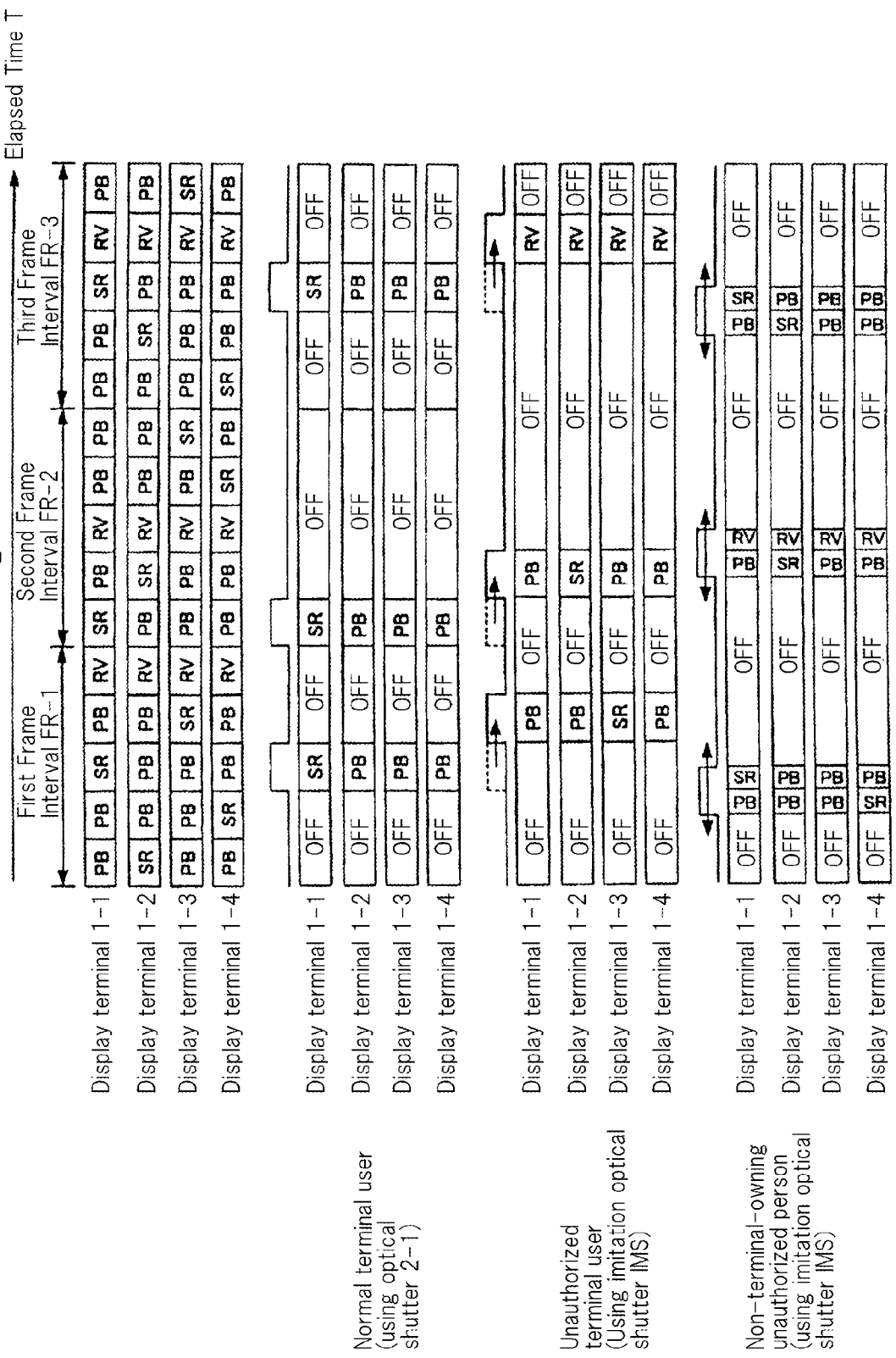
FIG. 9 is a view for describing an example of exclusive display control of the display system that is the fourth exemplary embodiment of the present invention and an unauthorized act realized by an imitation optical shutter regarding the operation of each display terminal in this exclusive display control.

In the example of exclusive display control shown in FIG. 9, display order determination unit 324 of display control apparatus 3 randomly alters the display timings (subframe number) of private pictures SR in display terminals 1-1-1-4 for each frame. This point differs from the exclusive display control shown in FIG. 3.

It is here assumed that user U1 of display terminal 1-1 is an unauthorized terminal user who sets the open/close timings of imitation optical shutter IMS based on picture assignment signal ASN that is received in display terminal 1-1 and who intends to unlawfully view pictures on other display terminals.

In the example shown in FIG. 9, display order determination unit 324 randomly assigns the display timings (display order) of private pictures SR for each frame. As a result, even if user U1 who is unlawfully using display terminal 1-1 that he or she is using is able to see private pictures SR in a particular frame through imitation optical shutter IMS, user U1 will not necessarily be able to see private pictures SR of the next frame. For example, it is possible that inverted pictures RV or public pictures PB will be seen in the next frame.

In the example shown in FIG. 9, one frame is made up from five subframes, private pictures SR and inverted pictures RV each being displayed in one subframe and public pictures PB being displayed in three subframes. In this case, there is a probability of ⅖ that an unauthorized user of a terminal will be able to view private pictures SR or inverted pictures RV by using imitation optical shutter IMS that is synchronized with the frame frequency at which display terminals 1-1-1-4 are displaying pictures.

The probability that an unauthorized user of a terminal can view private pictures SR or inverted pictures RV by using imitation optical shutter IMS decreases with an increase in the number of display terminals 1-1-1-4 that are the objects of exclusive display control.

According to the present exemplary embodiment as described hereinabove, the unauthorized viewing of private pictures SR by, for example, an unauthorized terminal user can be made more difficult (the possibility of unauthorized viewing can be decreased) than when implementing the exclusive display control shown in FIG. 3 in the first exemplary embodiment.

Further, according to the present exemplary embodiment, private pictures SR, public pictures PB, and inverted pictures RV that are displayed by display terminals 1-1-1-4 are visible at random in each frame. This results in increased flicker and is perceived as an extremely annoying picture by the viewer.

In the following explanation, the pictures among private pictures SR, inverted pictures RV and public pictures PB that are randomly displayed in subframes and that are unlawfully viewed through imitation optical shutter IMS in which open/close timings have been set to synchronize with the start timing and end timing of subframes at another display terminal are referred to as "synchronous random pictures."

In the example shown in FIG. 9, in intervals in which optical shutter 2-1 is in the ON state (intervals in which display terminal 1-1 is displaying private pictures SR), the other display terminals 1-2-1-4 are displaying public pictures PB. As a result, the effect of the present invention, which is to enable the avoidance of obstacles that prevent to the viewing of pictures without flicker even when pictures that are being displayed by other display terminals are visible, can be maintained for a normal user of a terminal (user U1 in the example of FIG. 9) who is viewing private pictures SR that are displayed by display terminal 1-1 synchronized with the display timings contained in picture assignment signal ASN.

When private pictures SR, public pictures PB, and inverted pictures RV are randomly displayed in each subframe as shown in FIG. 9, the frame frequency is preferably set to at least 120 Hz. In the exclusive display control shown in FIG. 9, the assignment of subframes is random, and there is consequently a possibility of assigning private pictures SR to the first subframe in one frame and then assigning private pictures SR to the fifth subframe in the next frame.

In the above-described case, regardless of whether the frame frequency has been set to 60 Hz, the frequency for only private pictures SR (the frequency of displaying private pictures SR when viewed through an optical shutter) falls to the level of approximately half, or to the order 30 Hz. As a result, the problems arise that flicker occurs in private pictures SR when viewed through optical shutters 2-1-2-4, and the picture quality drops.

However, when the frame frequency is set to at least 120 Hz, a display frequency of at least 60 Hz for private pictures SR can be ensured regardless of how display order determination unit 324 assigns pictures, and flicker when viewing through optical shutters 2-1-2-4 can thus be suppressed.

Fifth Exemplary Embodiment

The display system that is the fifth exemplary embodiment of the present invention is next described.

In the present exemplary embodiment, both the order of assigning pictures to subframes is made random for each frame as shown in FIG. 9 in the fourth exemplary embodiment and the length of frames (frame frequency) is altered for each of the frames.

In the exclusive display control shown in FIG. 9, the frame frequency at which display terminals 1-1-1-4 display pictures is fixed. As a result, when a non-terminal-owning unauthorized person uses imitation optical shutter IMS without being able to refer to picture assignment signals ASN to unlawfully view private pictures SR of display terminals 1-1-1-4, the unauthorized person is able to synchronize to the frame frequency by adjusting the frequency of opening/closing of imitation optical shutter IMS. In this case, however, the pictures that can be viewed by maximum adjustment of imitation optical shutter IMS by the non-terminal-owning unauthorized person are synchronized random pictures that include any pictures from among private pictures SR, inverted pictures RV and public pictures PB that are displayed in accordance with the random display order in a frame.

Figure 10:
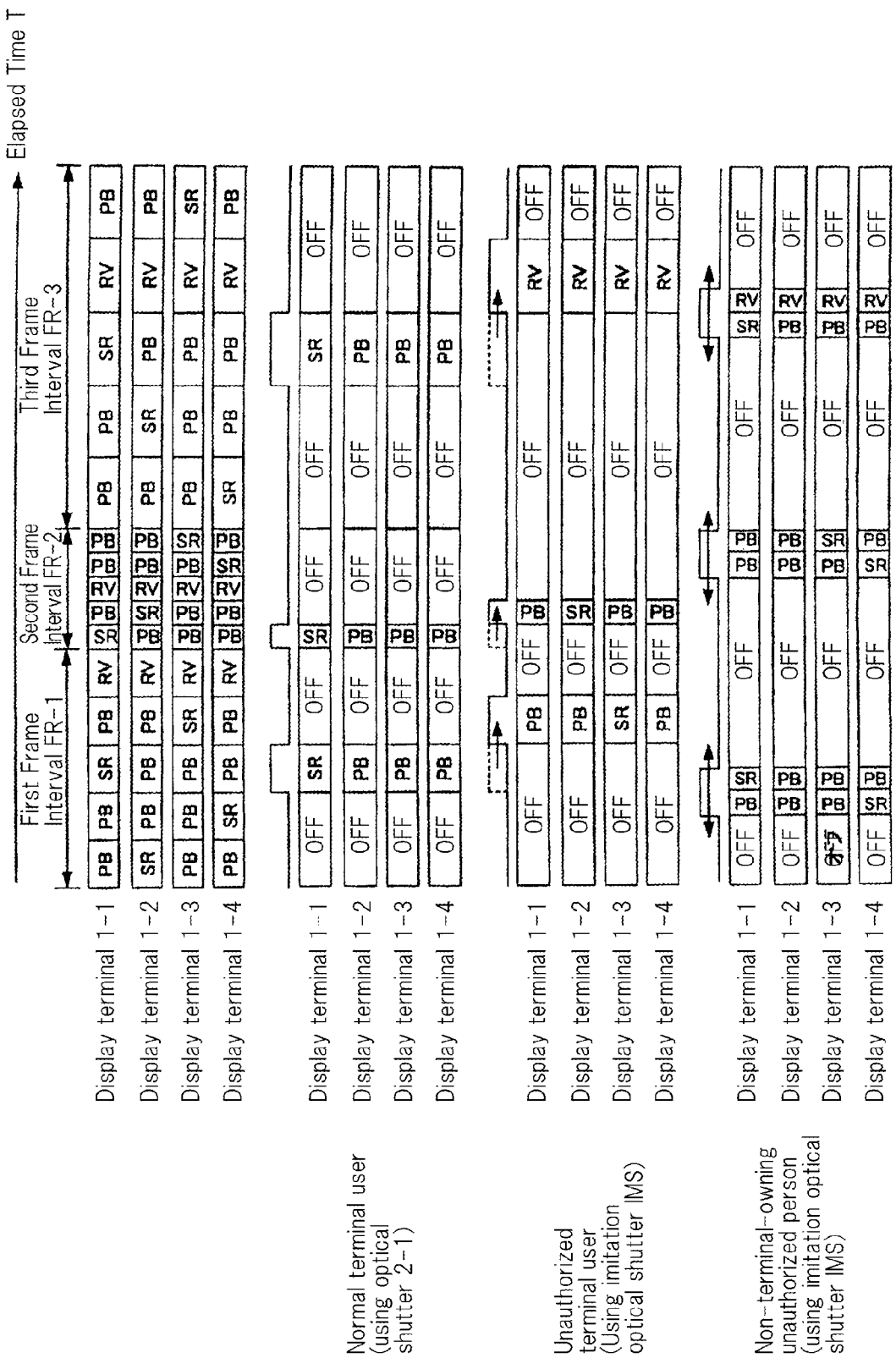
FIG. 10 is a view for describing an example of the exclusive display control of the display system that is the fifth exemplary embodiment of the present invention and an unauthorized act realized by an imitation optical shutter regarding the operation of each display terminal in this exclusive display control.

In the fifth exemplary embodiment, however, frame time determination unit 321 of display control apparatus 3 randomly sets the frame frequency for each frame as shown in FIG. 10.

In this case, the frame frequency differs for each frame, and as a result, a non-terminal-owning unauthorized person that attempts to unlawfully view private pictures SR is unable to make settings such that the frequency of opening/closing imitation optical shutter IMS are synchronized with the frame frequency of frames in which pictures are displayed in display terminals. In the exclusive display control shown in FIG. 10, pictures that a non-terminal-owning unauthorized person can view are pictures formed by the mixing of private pictures SR, inverted pictures RV, and public pictures PB that are displayed at random, and flicker is therefore even more severe than for synchronous random pictures. The content of private pictures SR is difficult to perceive from such pictures.

According to the present exemplary embodiment, the unauthorized viewing of private pictures SR by a non-terminal-owning unauthorized person that uses imitation optical shutter IMS can be made even more difficult than the exclusive display control shown in the fourth exemplary embodiment.

In the following explanation, the pictures that are visible in a state in which the opening/closing timings of imitation optical shutter IMS and the start or end timings of subframes cannot be synchronized are referred to as "asynchronous random pictures."

Taken from a different viewpoint, asynchronous random pictures can be considered equivalent to pictures having a high level of flicker that are perceived in a case in which pictures displayed by another display terminal are viewed through an optical shutter that is synchronized to the display of private pictures SR of one particular display terminal when there is a plurality of display terminals but no display control apparatus 3 and each display terminal displays private pictures SR, inverted pictures RV, and public pictures PB at its own individual display timings and frequency.

Regarding synchronous random pictures, on the other hand, although private pictures SR, inverted pictures RV, and public pictures PB are visible randomly, synchronization can be achieved with the start and end timings of subframes by adjusting the frequency and phase of opening/closing imitation optical shutter IMS. As a result, when still pictures are taken of displayed pictures through imitation optical shutter IMS at the timings of opening imitation optical shutter IMS, private pictures SR can be captured at a fixed probability. In other words, a state in which an outsider can view synchronous random pictures can be considered a state of lower concealment than a state in which an outsider can view asynchronous random pictures.

Sixth Exemplary Embodiment

The display system that is the sixth exemplary embodiment of the present invention is next described.

In the exclusive display control shown in FIGS. 8-10, as the subframes of display terminals 1-1-1-4 for each frame, subframe time determination unit 323 sets the same times among the terminals.

Figure 11:
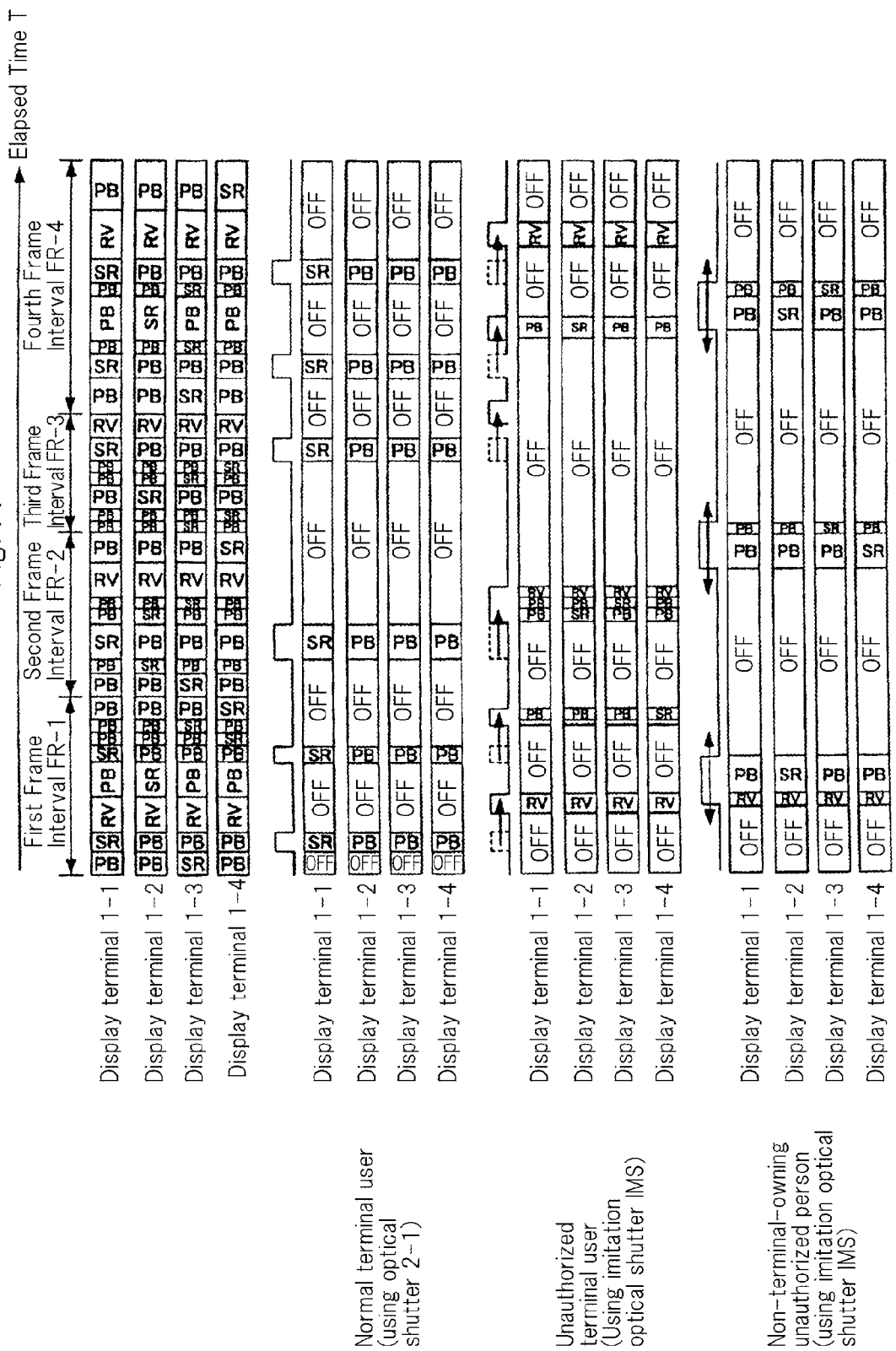
FIG. 11 is a view for describing an example of the exclusive display control of the display system that is the sixth exemplary embodiment of the present invention and an unauthorized act realized by an imitation optical shutter regarding the operation of each display terminal in this exclusive display control.

In the present exemplary embodiment, subframe time determination unit 323 randomly sets not only the frame frequency, but also the times of subframes for each of display terminals 1-1-1-4, as shown in FIG. 11.

When display control apparatus 3 implements the exclusive display control shown in FIG. 10, a non-terminal-owning unauthorized person is able to view no more than asynchronous random pictures despite adjusting the frequency or phase of opening/closing imitation optical shutter IMS.

However, even when display control apparatus 3 implements the exclusive display control shown in FIG. 10, an unauthorized terminal user (for example, user U1) is able to use display terminal 1-1 that he or she is using to receive picture assignment signals ASN. As a result, the unauthorized terminal user can learn the frame frequency for all frames by referring to the picture assignment signals ASN.

The frame frequency among display terminals 1-1-1-4 is the same in each of the frames. As a result, when an unauthorized terminal user adjusts the frequency and phase of the opening/closing of imitation optical shutter IMS based on the picture assignment signals ASN that were received at display terminal 1-1 that he or she is using, the unauthorized user is able to use imitation optical shutter IMS to view not asynchronous random pictures but synchronous random pictures. In other words, implementing the exclusive display control shown in FIG. 10 can make the unauthorized viewing of private pictures SR by a non-terminal-owning unauthorized person more difficult and can thus improve concealment compared to implementing the exclusive display control shown in FIG. 9, but cannot improve the degree of concealment when private pictures SR have been unlawfully viewed by an unauthorized terminal user.

In contrast, when the exclusive display control shown in FIG. 11 is implemented by display control apparatus 3, the subframe times of display terminals 1-1-1-4 are not fixed. As a result, even when an unauthorized terminal user refers to picture assignment signals ASN that were received using the display terminal that he or she is using, the unauthorized terminal user is unable to learn the subframe times (the start and end timings of subframes) in display terminals other than the display terminal that he or she is using.

In other words, according to the present exemplary embodiment, even should an unauthorized terminal user adjust the frequency or phase of opening/closing of imitation optical shutter IMS based on display timings indicated by picture assignment signals ASN that have been received through the use of the display terminal that he or she is using, the unauthorized terminal user is unable to view pictures (for example, synchronous random pictures) that are easier to perceive than asynchronous random pictures.

Still further, the number of times private pictures SR or inverted pictures RV are displayed in one frame may be a plurality. In such cases, subframe time determination unit 323 should determine each of the times, in a plurality of subframes, during which private pictures SR are displayed and each of the times, in a plurality of subframes, during which inverted pictures RV are displayed such that the total time that private pictures SR are displayed in one frame and the total time that inverted pictures RV are displayed have the same value.

Still further, display control unit 32 may alter the brightness of private pictures SR and the brightness of inverted pictures RV for each subframe. In this case, a value realized by totaling, for all subframes in which private pictures SR are displayed within one frame, the products of the brightness of private pictures SR in each subframe in which private pictures SR are displayed and the subframe interval should be set to be equal to a value realized by totaling, for all subframes in which inverted pictures RV are displayed, the products of the brightness of inverted pictures RV in each subframe in which inverted pictures RV are displayed and the subframe interval. When these values are not the same, the brightness is strongly displayed for one pictures from among private pictures SR and inverted pictures RV, with the result that the content of private pictures SR is divulged even to a person not looking through an optical shutter.

In the exclusive display control shown in FIG. 11, in an interval in which a display terminal among a plurality of display terminals is displaying private pictures SR, all of the other display terminals are displaying public pictures PB. As a result, when normal users of terminals use optical shutters 2-1-2-4 that operate in synchronization with the subframe frequency to view the screen of another display terminal, the effect of the present invention, which is the prevention of flicker in pictures, is maintained.

Figure 12:
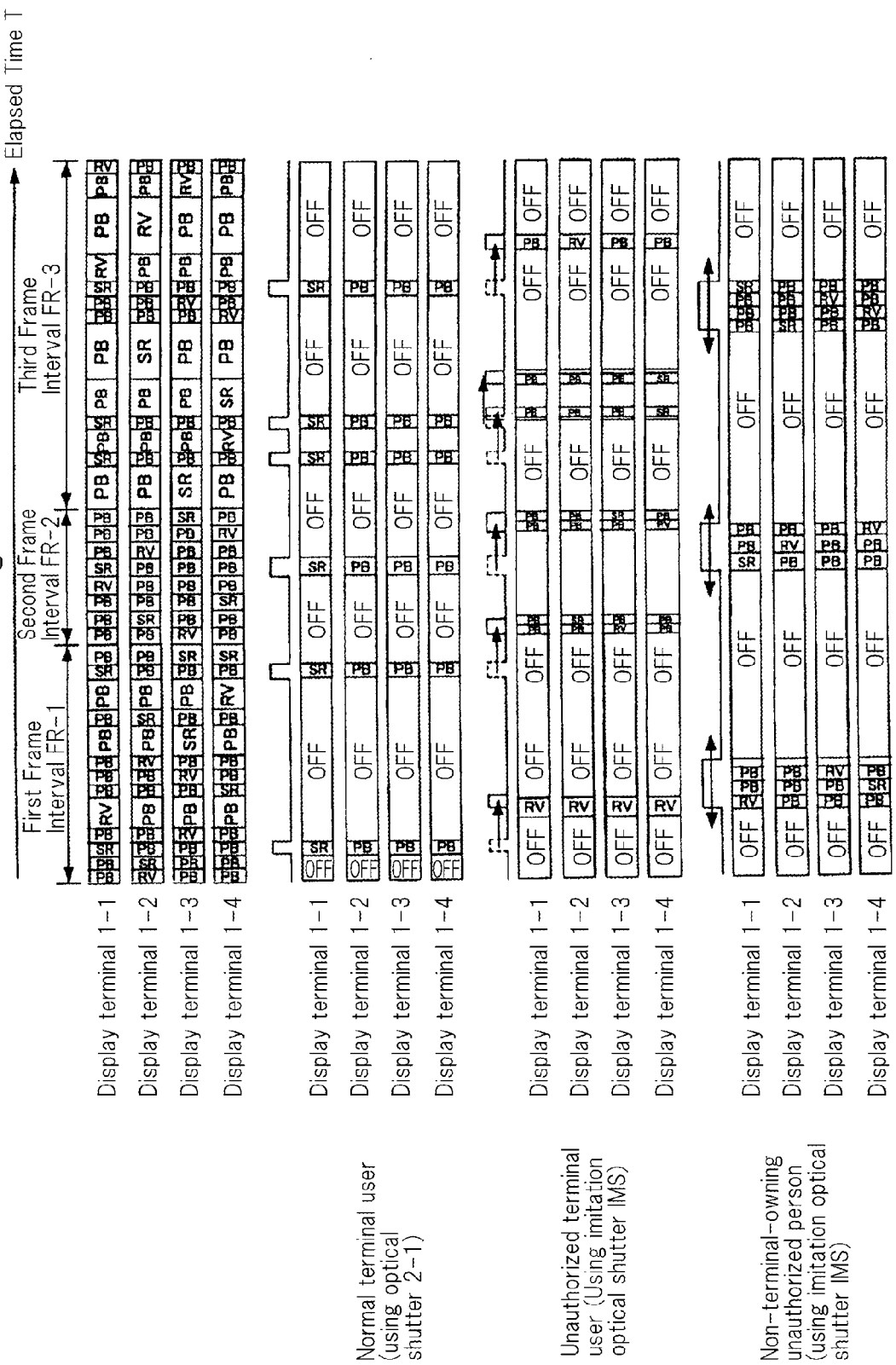
FIG. 12 is a view for describing an example of the exclusive display control of the display system that is the seventh exemplary embodiment of the present invention and an unauthorized act realized by an imitation optical shutter regarding the operation of each display terminal in this exclusive display control.

In any of the exclusive display controls shown in FIGS. 9-11, the number of times private pictures SR are displayed in one frame can be made two or more times, as shown in FIG. 12. When private pictures SR are displayed two or more times in one frame, the same private pictures SR may be displayed each time.

One private picture SR may be composed of a plurality of partial private pictures PSR1-N that are different from each other (where N is an integer equal to or greater than 2), and these partial private pictures PSR1-N may be displayed one at a time. In this case, the entire private picture SR can be seen when all of the plurality of partial private pictures PSR1-N can be seen. This distribution and displaying of private picture SR can realize a further improvement of the concealment of private pictures SR.

For example, a non-terminal-owning unauthorized person or an unauthorized terminal user that attempts to unlawfully view private pictures SR that are displayed by a display terminal that is being used by another user will be unable to learn the content of a completed private picture SR by seeing only a portion of the plurality of partial private pictures PSR1-N that make up one entire private picture SR. An entire private picture SR can be seen only when viewing all of the plurality of partial private pictures PSR1-N that make up an entire private picture SR that is displayed in one frame.

As a result, the effect of enabling a decrease of the possibility (probability) that private pictures SR will be unlawfully viewed is obtained when the subframe times, frame frequency, or assignment of the order of displaying pictures has been set randomly as in the exclusive display control that is shown in FIGS. 8-10.

Seventh Exemplary Embodiment

The display system that is the seventh exemplary embodiment of the present invention is next described.

Inverted pictures RV are pictures for cancelling private pictures SR and have information with high spatial correlation with private pictures SR.

When the display intervals of inverted pictures RV are therefore set identically among display terminals 1-1-1-4, the danger arises that, by using any display terminal of display terminals 1-1-1-4, the display intervals of inverted pictures RV of other display terminals will be inferred. In this case, the concern arises that when an unauthorized terminal user is able to view inverted pictures RV by using imitation optical shutter IMS, the unauthorized user will then be able to infer the content of private pictures SR and the concealment of information will thus be compromised.

The display system of the present exemplary embodiment implements exclusive display control that is capable of improving concealment of private pictures SR. This exclusive display control is next described.

In the present exemplary embodiment, subframe time determination unit 323 of display control unit 32 randomly sets the display interval of private pictures SR and the display interval of inverted pictures RV for each frame for each of display terminals 1-1-1-4, as shown in FIG. 12.

In addition, display order determination unit 324 randomly sets the display order of private pictures SR and the display order of inverted pictures RV for each frame for each of display terminals 1-1-1-4.

In order not to detract from the convenience for normal terminal users that use optical shutters 2-1-2-4 that operate in synchronization with the subframe frequency, it is crucial that the display intervals of inverted pictures RV be mutually exclusively set with the intervals in which display terminals 1-1-1-4 each display private pictures SR. For example, the intervals in which display terminals 1-2-1-4 display inverted pictures RV should be set to intervals other than intervals in which display terminal 1-1 displays private pictures SR.

Although private pictures SR must be mutually exclusively displayed among display terminals 1-1-1-4, there is no necessity for the exclusive display of inverted pictures RV. This is because inverted pictures RV are pictures for making private pictures invisible to third persons who are not wearing optical shutters, and all optical shutters 2-1-2-4 are in the blocked state during the display intervals of inverted pictures RV.

The method of exclusively setting the display intervals of inverted pictures RV with the display intervals of private pictures SR in display terminals 1-1-1-4 is not limited to the exclusive display control shown in FIG. 11 but can also be applied to the exclusive display control shown in FIGS. 8-10.

Eighth Exemplary Embodiment

The display system that is the eighth exemplary embodiment of the present invention is next described.

In order to realize the exclusive display control described in each exemplary embodiment, display terminals 1-1-1-4 must switch and display a plurality of pictures (private pictures SR, inverted pictures RV, and public pictures PB) at high speed within one frame. For this purpose, displays that are suitable for high-speed display such as an organic EL or FED (Field Emission Display) are preferably used as display units 12-1-12-4 that belong to each of display terminals 1-1-1-4.

As typical displays, liquid crystal displays have become widely used, but liquid crystal elements have a far slower response speed than organic EL. As a result, when liquid crystal elements are used to realize high-speed display of pictures such as described in each of the exemplary embodiments, although only private pictures SR are supposed to be visible when viewing through an optical shutter at the time of switching pictures (for example, during switching from public pictures PB to private pictures SR), picture crosstalk, i.e., the unwanted appearance of a picture that was displayed in the immediately preceding subframe (for example, public picture PB) will occur.

The display system of the present exemplary embodiment avoids the occurrence of the above-described state and is provided with liquid crystal display units 12-1-12-4 with high picture quality that are free of crosstalk even in high-speed display. Because these display units 12-1-12-4 have the same construction, the following explanation takes display unit 12-1 as an example.

A first example will be described in which a liquid crystal display device is used as display unit 12-1 that is suitable for the present invention.

Figure 13:
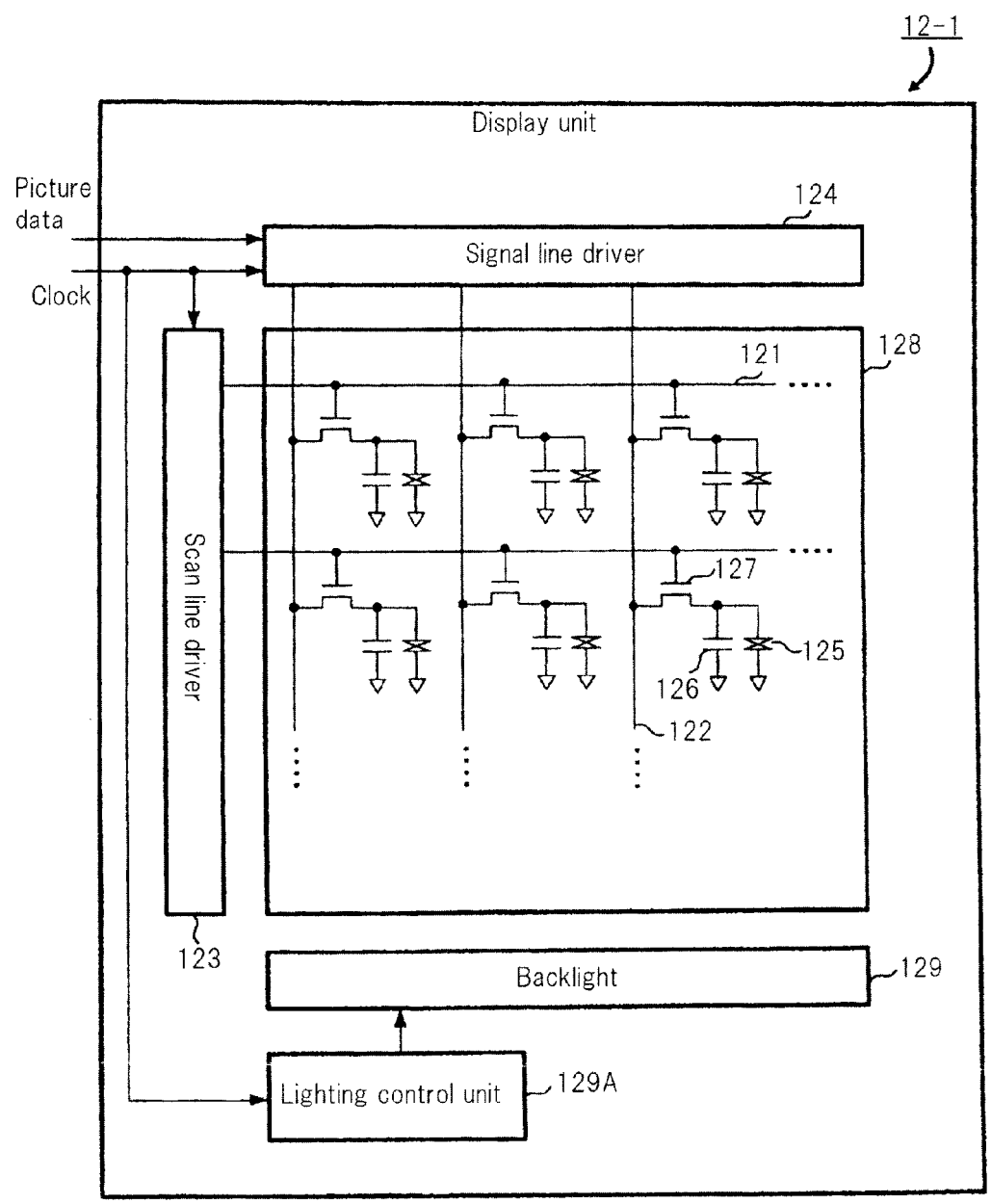
FIG. 13 is a block diagram showing a first example of the configuration of the display unit used in a display terminal of the display system of the present invention.

As shown in FIG. 13, display unit 12-1 includes a plurality of scan lines 121 and a plurality of signal lines 122 that intersect each other and that are arranged to form a grid. Display unit 12-1 further includes scan line driver 123 that controls the supply of signals to the plurality of scan lines 121 and signal line driver 124 that controls the supply of signals to the plurality of signal lines 122.

Display unit 12-1 further includes a plurality of picture elements 125 that are arranged so as to form a grid in the vicinity of each intersection of the plurality of scan lines 121 and the plurality of signal lines 122, and moreover, that are connected by way of thin-film transistor 127 (hereinbelow abbreviated as TFT 127) to scan line 121 and signal line 122 that form the intersection, and a plurality of storage capacitances 126 that are connected in parallel to these picture elements 125. The number of storage capacitances 126 is the same as the number of picture elements 125. Of picture elements 125 that are arranged in a grid form, the region that is composed of picture elements 125 that actually displays picture data is effective display region 128.

Scan line driver 123 controls the ON or OFF of TFT 127 that is a switching element by applying a scan signal to scan line 121.

When scan line driver 123 applies a scan signal to a specific scan line 121 and TFT 127 that is connected to the specific scan line 121 turns ON, signal line driver 124 applies a gradation voltage that corresponds to picture data to storage capacitance 126 and picture element 125 that are connected to that TFT 127.

Storage capacitances 126 hold the gradation voltage that was applied for a fixed interval. The application of the gradation voltage that is held by storage capacitance 126 to picture element 125 changes the transmittance of the liquid crystal of picture element 125. By the transmission of light that is irradiated from backlight 129 through the liquid crystal of picture element 125, the light is modulated and a picture is displayed.

The order in which scan line driver 123 selects lines of picture elements 125 in one-line portions is arbitrary. For example, scan line driver 123 may select one line at a time from the top to the bottom of the screen or from the bottom to the top, or may perform interlaced scanning for each line. At this time, signal line driver 124 supplies picture data in one-line portions to lines of picture elements 125 that were selected in the order of selection by scan line driver 123.

Figure 14:
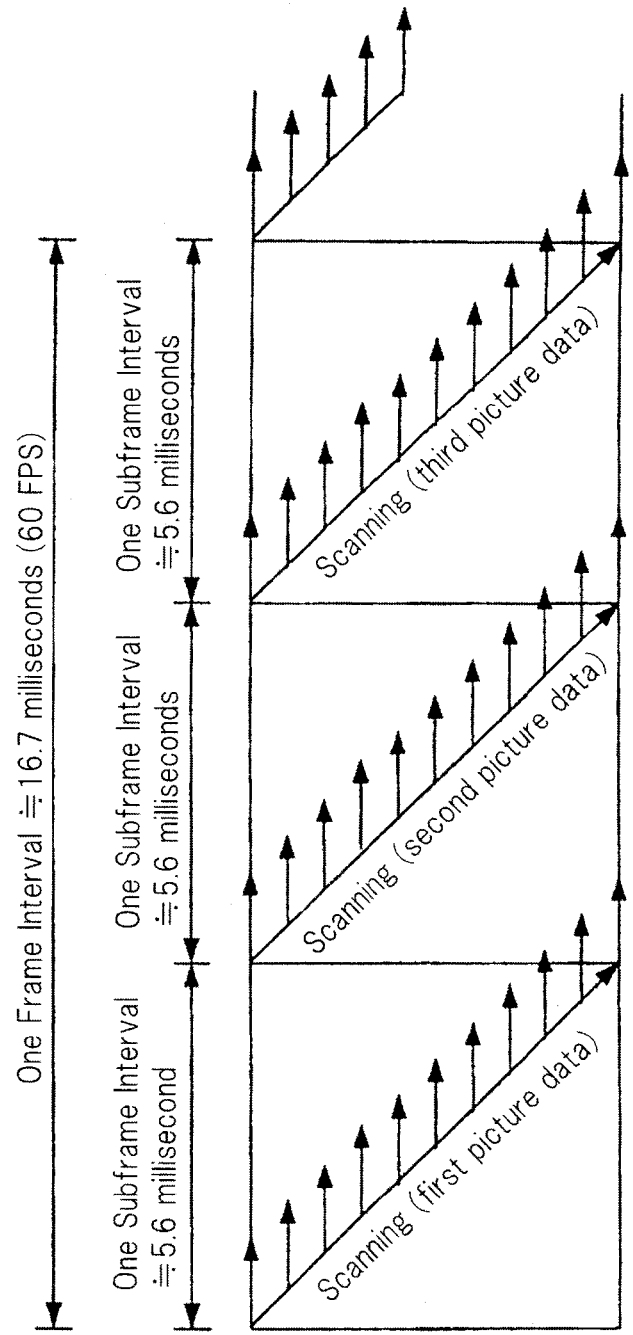
FIG. 14 is a schematic view showing a first example of the operation of the display unit shown in FIG. 13.

FIG. 14 shows an example of a timing chart of a one-frame interval in display unit 12-1 that was shown in FIG. 13. In this example, the frame frequency is 60 Hz, and a plurality of pictures, i.e., private pictures SR, inverted pictures RV, and public pictures PB, are displayed in three subframes that are contained in one frame (1/60 seconds≈16.7 msec). In FIG. 14, the pictures that are displayed in the first subframe of the three subframes are referred to as first pictures, the pictures that are displayed in the second subframe are referred to as second pictures, and the pictures displayed in the third subframe are referred to as third pictures.

Each subframe is displayed for an interval of one-third of one frame, i.e., for approximately 5.6 msec. In the example of FIG. 14, the order of scanning and display is the order of the first pictures, second pictures and third pictures. However, in some cases an order that differs from this order may occur due to the assignment of picture assignment signals ASN. Public pictures are in some cases displayed continuously.

A second example is next described for a case of using a liquid crystal display device as display unit 12-1 that is suitable for the present invention.

Figure 15:
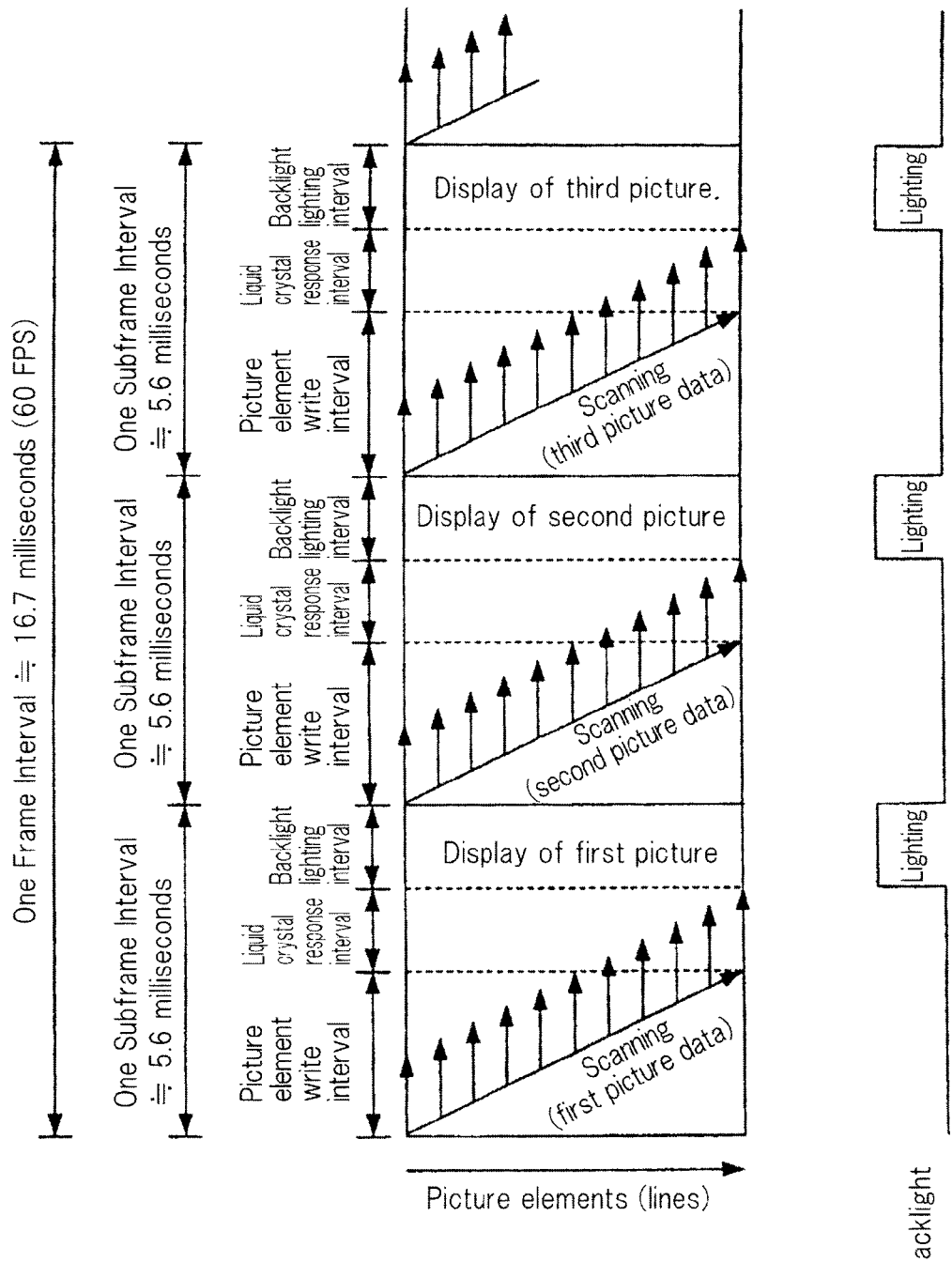
FIG. 15 is a schematic view showing a second example of the operation of the display unit shown in FIG. 13.

FIG. 15 is another timing chart in display unit 12-1 shown in FIG. 13. In FIG. 15, pictures that are displayed in the first subframe among three subframes are referred to as first pictures, pictures that are displayed in the second subframe are referred to as second pictures, and pictures that are displayed in the third subframe are referred to as third pictures.

In the example of FIG. 15, after the operation of writing picture data to picture elements 125 (scanning) has been performed in the intervals that are shorter than one subframe and after waiting for the response of the liquid crystal of each picture element 125, lighting control unit 129A performs drive for lighting backlight 129 (i.e., backlight blinking drive). As a result, when users U1-U4 view private pictures SR through optical shutters 2-1-2-4, pictures can be seen that have less crosstalk than in the scanning method shown in FIG. 14.

However, although picture quality is improved in the backlight blinking drive shown by way of example in FIG. 15, the operation of writing picture data to picture elements 125 (scanning) must be implemented at twice the speed as the scanning speed shown by way of example in FIG. 14.

Scanning lines 121 or signal lines 122 shown in FIG. 13 are formed by a conductor composed of, for example, an alloy of chromium (Cr) or aluminum (Al). However, the signal line length with respect to the signal line width is extremely long for each of scanning lines 121 and signal lines 122. As a result, when viewed from the side that is connected with scan line driver 123 or signal line driver 124, scan line 121 and signal line 122 are seen as a load that is made up from the resistance component and capacitance component.

In addition, it can be seen that picture element 125 itself forms a load that is made up from the resistance component of TFT 127 and storage capacitance 126 (having the same configuration as a low-pass filter that employs a typical RC circuit in the example of FIG. 13).

As a result, when attempting to raise the scanning speed (frequency), distortion of the waveform of the signal that is supplied from scan line driver 123 or signal line driver 124 occurs due to the above-described resistance-capacitance load. In this case, regardless of whether a signal is supplied from scan line driver 123 or signal line driver 124, the proper gradation voltage that is supposed to be applied to picture element 125 in some cases cannot be applied. When the proper gradation voltage cannot be applied to picture element 125, picture element 125 cannot be driven normally, which brings about not only various defects such as a drop in picture quality but also prevents private pictures SR from being cancelled by inverted pictures RV and decreases the concealment of information.

A third example is described that, in order to avoid the occurrence of such conditions, employs a liquid crystal display device that carries out backlight blinking drive without raising the scanning speed as display unit 12-1 that is suitable for the present invention.

Figure 16:
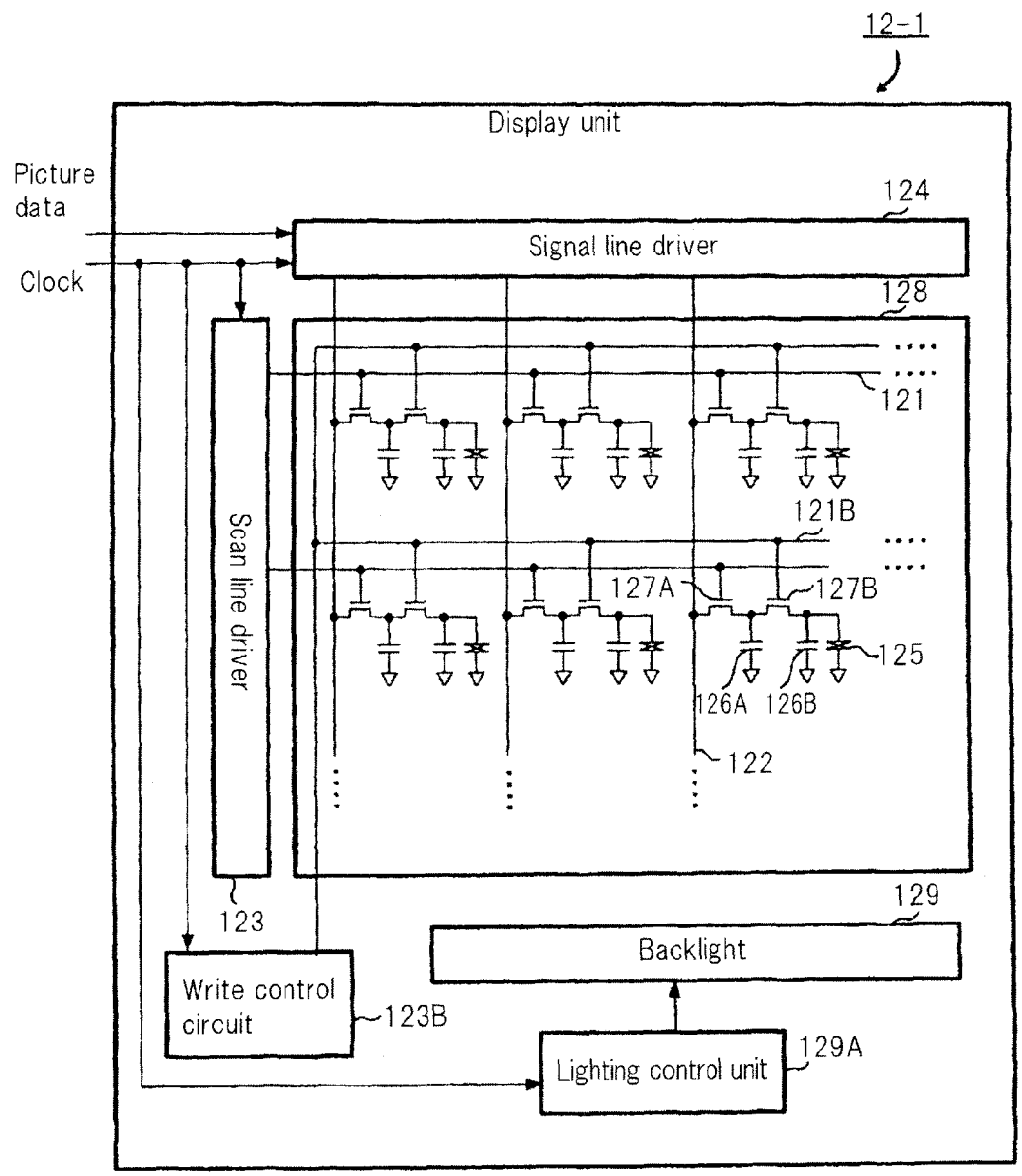
FIG. 16 is a block diagram showing a second example of the configuration of the display unit used in the display terminal of the display system of the present invention.

FIG. 16 shows the configuration of display unit 12-1 that performs backlight blinking drive without raising the above-described scanning speed.

The difference between the configuration shown in FIG. 13 and the configuration shown in FIG. 16 is as described below.

Display unit 12-1 shown in FIG. 16 has two TFTs, TFT 127A and TFT 127B as the TFT that make up one picture element 125. In addition, display unit 12-1 shown in FIG. 16 includes two storage capacitances 126A and 126B as the storage capacitance.

In display unit 12-1 shown in FIG. 16, write control circuit 123B rather than scan line driver 123 turns ON or OFF TFT 127B that is adjacent to each picture element 125 through a plurality of write control lines 121B for the entire screen all at once. Write control circuit 123B may be incorporated in scan line driver 123 or signal line driver 124.

The plurality of write control lines 128 are arranged approximately parallel to the plurality of scan lines 121, and picture elements 125, TFT 127A and 127B, and storage capacitances 126A and 126B are provided at each intersection of the plurality of signal lines 122 and these write control lines 128 and scan lines 121.

Figure 17:
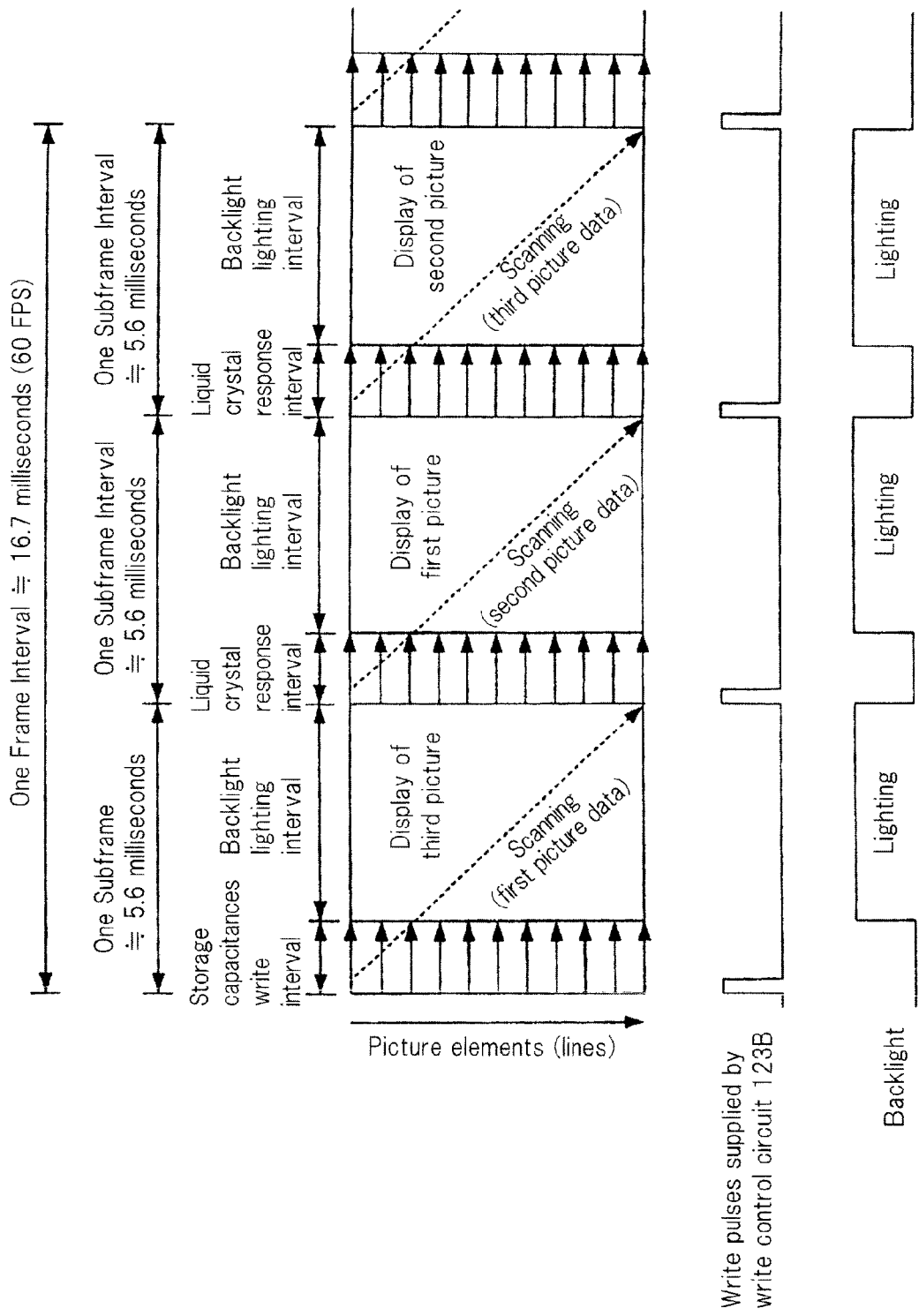
FIG. 17 is a schematic view showing an example of the operation of the display unit shown in FIG. 16.

FIG. 17 shows an example of a timing chart of one frame in display unit 12-1 shown in FIG. 16.

As shown in FIG. 17, scan line driver 123 controls the ON and OFF of TFT 127A that is connected to the scan lines 121 by applying a scan signal as input to scan lines 121.

When scan line driver 123 turns ON TFT 127A, signal line driver 124 first applies a gradation voltage that accords with picture data to storage capacitances 126A. Storage capacitances 126A stores the gradation voltage that was applied.

When scanning (writing) by scan line driver 123 and signal line driver 124 has been completed to all picture elements 125 that make up a screen, write control circuit 123B turns ON TFT 127B of all picture elements 125 all at once, whereupon the gradation voltage that is stored in storage capacitances 126A is written to picture elements 125 and the entire screen is refreshed by new picture data.

In addition, immediately after all TFT 127B have been turned ON all at once, write control circuit 123B turns OFF TFT 127B of all picture elements all at once. Scan line driver 123 then works in concert with signal line driver 124 to scan (write) the next picture data. During this scanning, display unit 12-1 displays the picture data that immediately precedes the picture data that is being scanned.

In the example shown in FIG. 17, compared to the timing chart shown in FIG. 15, all of one subframe interval (approximately 5.6 msec) can be used as a scanning interval for carrying out writing to picture elements. In other words, writing can be carried out to picture elements 125 in a scanning interval of the same time as the timing chart shown in FIG. 14, and increase of the scanning speed can be avoided.

In addition, lighting control unit 129A lights backlight 129 after TFT 127B turn ON, the picture is refreshed, and the liquid crystal response ends. As a result, compared to the lighting operation shown in FIG. 15, the additional effects of enabling lengthening of the lighting interval of backlight 129 and improving brightness are obtained.

When voltage is written to picture elements all at once by write control circuit 123B in the configuration of FIG. 16, the voltage that is applied to picture elements 125 is determined by the capacitance coupling of storage capacitance 126A and storage capacitance 126B. However, when the preceding gradation voltage of the picture data remains in storage capacitances 126B, the applied voltage may in some cases diverge from the desired gradation voltage due to the value of this residual voltage. To cancel the influence (hysteresis effect of this residual voltage), a reset TFT for resetting the voltage that is applied to the liquid crystal picture elements 125 to a predetermined voltage (for example, the GND level, which is the ground potential) may be separately provided in each picture element 125. In this case, immediately before write control circuit 123B turns ON TFT 127B all at once (essentially, the gradation voltage stored by storage capacitance 126A is written to picture element 125), reset TFT is once turned ON and all of picture elements 125 are further reset all at once. When writing the gradation voltage by means of this operation, the desired gradation voltage can be written reliably without storing the residual voltage attendant to the previous picture data in storage capacitance 126B, whereby the display picture quality can be improved.

In the present invention, display units 12-1-12-4 preferably display public pictures PB or display nothing at all in intervals other than the intervals of displaying private pictures SR or inverted pictures RV.

In order to display nothing in display unit 12-1, a monochrome picture, which is a picture in which, for example, the gradation (for example, black levels) is uniform, may be displayed.

When display unit 12-1 shown in FIG. 13 or FIG. 16 is used, backlight 129 may be extinguished in intervals other than the intervals of displaying private pictures SR or inverted pictures RV. In this way, power consumption due to backlight 129 can be avoided, and when a device such as a notebook personal computer that is driven by power supplied by, for example, a battery is used as display terminals 1- 1- 1- 4, private pictures SR, inverted pictures RV, and public pictures PB can be displayed for a longer time.

A fourth example of a case of using a liquid crystal display device as display unit 12-1 that is suitable for the present invention is next described.

In a typical liquid crystal display device, overdrive is known as another method for compensating for the response delay of liquid crystal.

Overdrive is a technique of determining the final picture values when the next frame is to be displayed on a display device based on a comparison of one picture that has been received (assumed to be the next frame) and the picture of the frame that immediately precedes the next frame and that is currently being displayed by display unit 12-1 (assumed to be the current frame).

More specifically, when the picture values of the next frame are greater than the picture values of the current frame, picture values that are even greater than the picture values of the next frame are determined as the final picture element values of the next frame.

In addition, when the picture values of the next frame are smaller than the picture values of the current frame, picture values that are even smaller than the picture values of the next frame are determined as the final picture element values.

For example, when the current frame is 100 gradations and the next frame is 150 gradations, 180 gradations are determined as the final picture element value of the next frame, and the 180 gradations that have been determined are displayed in the picture elements. When the original gradations (in this case 150 gradations) of the next frame are displayed in picture elements after having displayed the 100 gradations of the preceding frame, the next frame will not be able to reach the brightness that corresponds to 150 gradations due to the liquid crystal response delay. However, by assuming the next frame to be 180 gradations, the response of the liquid crystal rises steeply and can achieve the brightness that corresponds to 150 gradations.

In this way, the advantage of overdrive is that, instead of raising the liquid crystal response speed itself, the gradation when displaying the next frame is adaptively changed in accordance with the gradation difference between the current frame and the next frame to compensate for the delay of the liquid crystal response, whereby the desired brightness can be easily obtained.

A method is next described with reference to FIG. 17 for implementing overdrive when switching and displaying private pictures SR, inverted pictures RV, and public pictures PB within one frame by means of exclusive display control.

Figure 18:
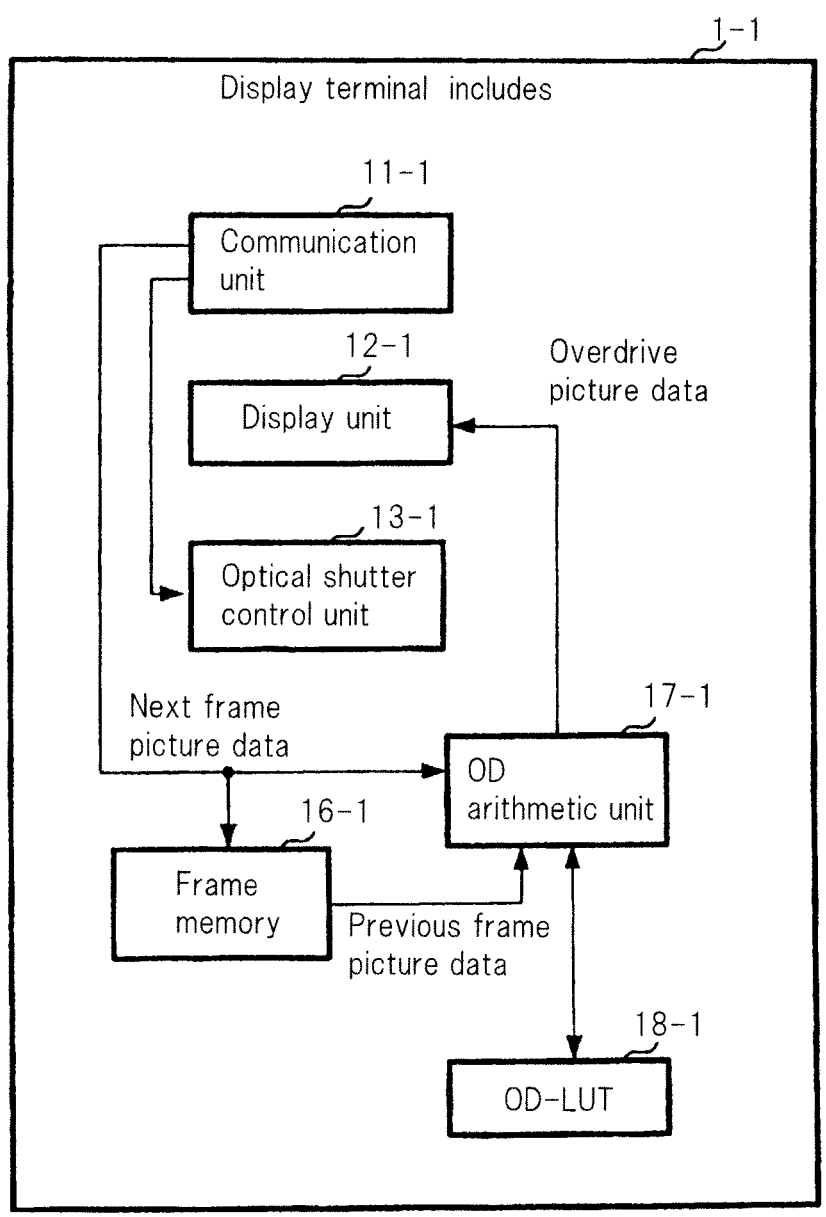
FIG. 18 is a block diagram showing an example of the configuration of the display terminal that carries out overdrive that is applied in a display terminal of the display system of the present invention.

When overdrive is implemented during exclusive display control, display terminal 1-1 includes, in addition to communication unit 11-1, display unit 12-1, and optical shutter control unit 13-1, frame memory 16-1, OD (overdrive) arithmetic unit 17-1, and OD-LUT (Look-Up Table) 18-1, as shown in FIG. 18. These are the points of difference with the configuration shown in FIG. 2.

Frame memory 16-1 plays the role of storing picture data of the current frame.

OD arithmetic unit 17-1 compares picture element values of pictures of the next frame that are transmitted in from a picture transmission source such as a PC with the picture element values of the pictures of the previous frame stored in frame memory 16-1. OD arithmetic unit 17-1 then, based on the result of comparison of the picture element values, determines the final picture element values (hereinbelow referred to as overdrive picture data) to be displayed on display unit 12-1 in the display of the next frame.

OD-LUT 18-1 is stored in, for example, a memory medium (not shown) such as ROM (Read Only Memory) or RAM (Random Access Memory).

OD-LUT 18-1 is information in which the picture element values of the picture data of the pictures of the next subframe, the picture element values of picture data of the pictures of the current subframe, and the picture element values of the overdrive picture data are placed in correspondence with each other. Here, the picture element values of the overdrive picture data correspond to output gradation.

When picture data of pictures (for example, private pictures SR) of the next subframe that are the operation object that corresponds to the operation object pictures are supplied as output from communication unit 11-1, OD arithmetic unit 17-1 reads as reference pictures (for example, public pictures) from frame memory 16-1 the picture data of pictures (for example, public pictures PB) of the current subframe that display unit 12-1 displays immediately before the next subframe.

OD arithmetic unit 17-1 next refers to OD-LUT 18-1 to specify the picture element values of overdrive picture data that are placed in correspondence with the set of the picture element values of picture data of pictures (for example, private pictures SR) of the next subframe and the picture element values of picture data of pictures of the current subframe. OD arithmetic unit 17-1 then supplies the overdrive picture data that contains the specified picture element values to display unit 12-1.

FIG. 19 shows an example of the data structure of OD-LUT 18-1 when the picture data is made up by 8-bit data.

As shown in FIG. 19, the picture element values of the overdrive picture data that are placed in correspondence with the set of the next subframe picture data that are the object of operation and the current subframe picture data that serve the role as reference pictures are arranged in matrix form in OD-LUT 18-1. When the picture data of each of the pictures that are the operation object and reference pictures are made up by L bits (where L is an integer equal to or greater than 1) of data, OD-LUT 18-1 includes output gradation placed in correspondence with each of sets of 2 L operation-object picture gradation and 2 L reference picture gradation.

In FIG. 19, when the next subframe picture data that is the object of operations is 1 and the current subframe picture data for reference is 3, OD arithmetic unit 17-1 specifies 10 as the overdrive picture data.

The overdrive picture data that are stored in OD-LUT 18-1 are set to picture element values with respect to the next frame picture data of one specific gradation (for example, 0 gradation) such that, regardless of the value of the current frame picture data for reference use (0-255 gradations), the brightness is fixed when the overdrive picture data are displayed as the next frame on display unit 12-1. By using OD-LUT 18-1 in this manner, display of the same brightness is possible regardless of the type of pictures of the subframe that immediately precedes the next frame. In other words, the response delay of the liquid crystal can be compensated for, and time-division display of high picture quality can be achieved.

OD-LUT 18-1 is not limited to a matrix made up of 256 rows by 256 columns that is shown by way of example in FIG. 19, and for example, may be a matrix made up of 8 rows by 8 columns for each 32 gradations. In this case, OD arithmetic unit 17-1 calculates picture element values of desired overdrive picture data by linear interpolation (interpolation operation). Decreasing the number of overdrive picture data that are stored in OD-LUT 18-1 enables an increase of the storable vacant capacity of the memory medium (not shown) that stores OD-LUT 18-1.

In addition, various modifications can be constructed within a scope that does not depart from the gist of the present invention.

In the examples described hereinabove, display control apparatus 3 effects control such that display terminals 1-1-1-4 exclusively display private pictures SR. However, due to the physical positional relations among display terminals 1-1-1-4, users U1-U4 that are wearing optical shutters 2-1-2-4 are in some cases unable to mutually view screens of display terminals being used by other users. For example, when the back surface of the display surface of display terminal 1-1 and the back surface of the display surface of display terminal 1-2 are arranged to face each other and when user U1 is in front of the display surface of display terminal 1-1 while user U2 is in front of the display surface of display terminal 1-2, the display surface of display terminal 1-2 cannot be seen by user U1, and conversely, the display surface of display terminal 1-1 cannot be seen by user U2.

When one user views the other display terminal in this case, there will be no flickering of the screen or divulged view of private pictures even when the exclusive display control according to the present invention is not implemented for these display terminals. As a result, the display timings of private pictures of display terminal 1-1 and display terminal 1-2 may be set to the same intervals and the relation between the timing at which display terminal 1-1 displays private pictures SR and the timing at which display terminal 1-2 displays private pictures SR need not be made exclusive.

This feature is not limited to private pictures SR, and the display timings of inverted pictures RV or public pictures PB may also be set to the same timings. Thus, a configuration in which display control apparatus 3 selects the presence or absence of exclusive display control according to the mutual positional relations among display terminals 1-1-1-4 enables an improvement of the freedom of the assignment of the display timings of each of display terminals 1-1-1-4.

For example, when display terminal 1-1 and display terminal 1-2 of the four display terminals 1-1-1-4 are in a positional arrangement as described above, although display control apparatus 3 is connected to the four display terminals 1-1-1-4, the number of display terminals that are the object of exclusive display control essentially becomes three. As a result, the number of processes in which display control apparatus 3 generates and transmits picture assignment signals ASN can be decreased.

In such a case, the time that display terminals 1-1-1-4 display private pictures SR in one frame can be lengthened. The brightness of private pictures SR that are seen through optical shutters 2-1-2-4 consequently increases, and an improvement of convenience can be obtained for users U1-U4.

The object of exclusive display control according to the present invention is the elimination of flicker of the pictures of other display terminals when viewing the screens of display terminals 1-1-1-4 through optical shutters 2-1-2-4. As a result, when display terminals are being used at a distance great enough that users cannot see the pictures being displayed by the display terminals that other users are using or when display terminals are arranged in different rooms that are partitioned by, for example, physical shields, the implementation of exclusive display control is unnecessary to begin with, and only one display control apparatus 3 need exist for each closed space, such as a room. In addition, there is no need for one physical display control apparatus 3 for each closed space such as a room, and when one display control apparatus 3 and a plurality of display terminals that are controlled by the display control apparatus 3 are viewed as a single system, only one device that performs the role as display control apparatus 3 in this system is necessary.

Figure 20:
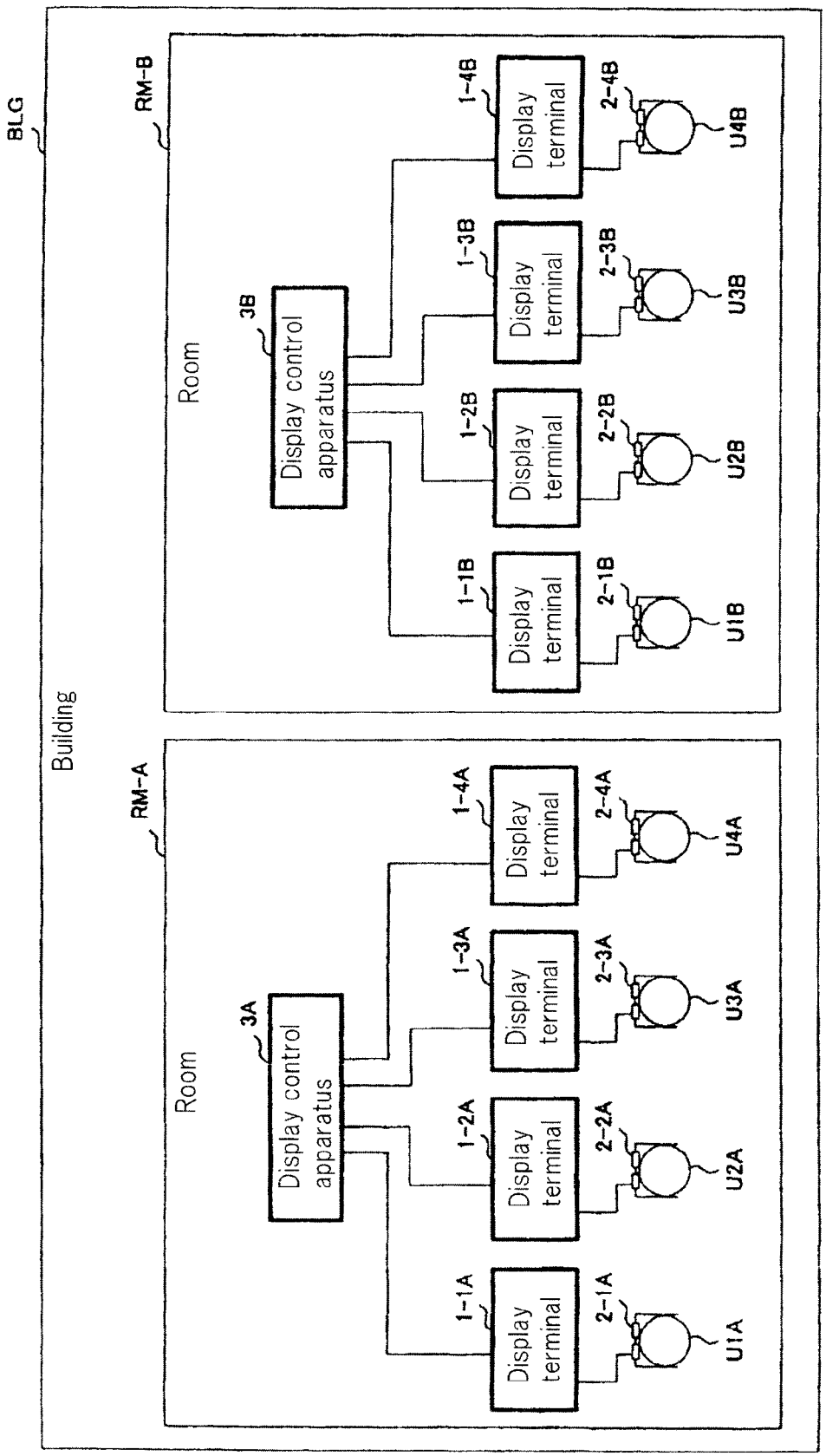
FIG. 20 is a schematic view for describing an example of the form that is used in the display system of the present invention.

As a concrete example, a building BLG that contains two rooms RM-A and RM-B is considered. In this case, as shown in FIG. 20, one display control apparatus 3A is installed in room RM-A and one display control apparatus 3B is installed in room RM-B. Display control apparatus 3A implements exclusive display control for display terminals 1-1A-1-4A that are installed in room RM-A. Display control apparatus 3B implements exclusive display control of display terminals 1-1B-1-4B that are installed in room RM-B.

In the example shown in FIG. 20, display control apparatus 3A and display control apparatus 3B are mutually independent control apparatuses. These display control apparatuses 3A and 3B may be constituted as one display control apparatus. In this case, the display control apparatus includes each of the constituent elements of display control apparatuses 3A and 3B.

When there is a plurality of display control apparatuses, each display terminal is preferably controlled such that the display terminal is not simultaneously connected to a plurality of display control apparatuses (for example, display control apparatuses 3A and 3B). When a particular display terminal is simultaneously connected to a plurality of display control apparatuses, this display terminal receives picture assignment signal ASN that is transmitted in from each of display control apparatuses with which it is connected. In this case, it is difficult for the display terminal to distinguish which of the picture assignment signals ASN that it has received should be the basis for executing the switching and displaying of private pictures SR, inverted pictures RV, and public pictures PB.

In the present invention, each of the processors in the display control apparatus other than those that are realized by dedicated hardware may be realized by recording a program to realize the functions of the processors on a recording medium that can be read in a display control apparatus and then by causing the display control apparatus to read and execute the program that has been recorded on this recording medium. The recording medium that can be read by a display control apparatus refers to a recording medium that can be relocated such as a floppy disk (registered trademark), a magneto-optic disc, a DVD, or a CD, or refers to a medium such as an HDD that can be incorporated in a display terminal. The program that is recorded on this recording medium is read to, for example, a control unit belonging to a display control apparatus, and processes that are equivalent to those described hereinabove are carried out under the control of the control unit.

The control unit that belongs to the display control apparatus in this case is a device that operates as a computer that executes the program that has been read from a recording medium onto which the program has been recorded. The above-described program can be applied similarly to display terminals 1-1-1-4.

Although the present invention has been described with reference to the above-described exemplary embodiments, the present invention is not limited to the exemplary embodiments described hereinabove. The constitution and operation of the present invention is open to various modifications within a scope that does not depart from the gist of the present invention that will be clear to one of ordinary skill in the art.

This application claims the benefits of priority based on Japanese Patent Application No. 2008-322372 for which application was submitted on Dec. 18, 2008 and incorporates by citation all of the disclosures of that application.

The invention claimed is:

1. A display system comprising:
   a plurality of terminals that display pictures within subframes of successive frames;
   a control apparatus that controls displaying said pictures, within said subframes of said successive frames, on each of said plurality of terminals; and
   a plurality of optical shutters provided respectively corresponding to each of said plurality of terminals, said shutters being placed in a state of transmitting incident light in subframe intervals in which said pictures are displayed on said terminals that correspond to said shutters and in a state of blocking incident light in other subframe intervals in which said pictures are not displayed on said corresponding terminals;
   wherein said plurality of terminals are arranged in proximity to each other, and
   wherein said control apparatus controls said plurality of terminals such that said pictures are non-simultaneously displayed on said plurality of terminals.

2. The display system as set forth in claim 1, wherein said control apparatus causes each of said plurality of terminals to display said pictures and other pictures that differ from said pictures in time divisions and synchronizes switching among said plurality of terminals of pictures that are displayed on each of said terminals.

3. The display system as set forth in claim 2, wherein:
   said other pictures include canceling pictures that cancel said pictures; and
   said control apparatus effects control such that, for each of said plurality of terminals, the display interval of said canceling pictures on a terminal does not overlap with the display interval of said pictures on the other terminals.

4. The display system as set forth in claim 3, wherein:
   said canceling pictures are composed of a plurality of picture elements that correspond to the plurality of picture elements that make up said pictures; and
   when the brightness values of picture elements that correspond to said pictures are added to the brightness values of each picture element, the brightness value of each picture element after addition is fixed.

5. The display system as set forth in claim 2, wherein said other pictures include public pictures that differ from both pictures of said pictures and canceling pictures.

6. The display system as set forth in claim 5, wherein said public pictures are monochrome pictures in which gradations are uniform.

7. The display system as set forth in claim 5, wherein said control apparatus causes each of said plurality of terminals to display said pictures, said canceling pictures, and said public pictures in time divisions in each frame; and the display order of said pictures, said canceling pictures, and said public pictures is the same in each frame.

8. The display system as set forth in claim 5, wherein said control apparatus randomly determines the display order of displaying said pictures, said canceling pictures, and said public pictures in time divisions in each frame for each of said plurality of terminals.

9. The display system as set forth in claim 7, wherein said control apparatus randomly sets the period of said frame for each of said plurality of terminals.

10. The display system as set forth in claim 7, wherein, said control apparatus randomly sets the display intervals of each of said pictures, said canceling pictures, and said public pictures in said frame for each of said plurality of terminals.

11. The display system as set forth in claim 7, wherein said control apparatus causes said plurality of terminals to simultaneously display said public pictures over a predetermined time interval.

12. The display system as set forth in claim 7, wherein said control apparatus causes the display of said pictures a plurality of times within said frame for each of said plurality of terminals.

13. The display system as set forth claim 7, wherein:
   said pictures include a plurality of partial pictures that form entire said pictures when the brightness of each partial picture is added each other; and
   said control apparatus causes each of said plurality of partial pictures to be displayed one at a time within said frame for each of said plurality of terminals.

14. The display system as set forth in claim 2, wherein said control apparatus controls said plurality of terminals such that said canceling pictures are not simultaneously displayed on said plurality of terminals.

15. The display system as set forth in claim 1, wherein the display frequency of said pictures on each of said plurality of terminals is at least 60 Hz.

16. The display system as set forth in claim 1, wherein the display frequency of said pictures on each of said plurality of terminals is at least 120 Hz.

17. The display system as set forth in claim 1, wherein:
each of said plurality of terminals includes:
a key generation unit that generates an encryption key that is unique to its own terminal and a decryption key for decoding data that have been encrypted by the encryption key and transmits the encryption key that was generated to said control apparatus;
a decryption unit that uses the decryption key that was generated in said key generation unit to decode display timing signals that are received from said control apparatus; and
a display unit that displays pictures based on a display timing signal that is decoded by said decryption unit; and
said control apparatus, for each of said plurality of terminals, receives said encryption key that was transmitted from said key generation unit of the terminal, uses the encryption key that was received to encrypt a signal for controlling the display of pictures on the terminal, and transmits the signal that was encrypted as said display timing signal to the terminal.

18. The display system as set forth in claim 1, wherein:
said control apparatus, for each of said plurality of terminals, transmits display timing signals for controlling display of pictures on the terminals and subsequently transmits period synchronizing signals that indicate the start timing of picture display based on said display timing signals to said plurality of terminals all at once; and
each of said plurality of terminals, after the reception of said display timing signal to its own terminal and upon receiving said period synchronizing signal from said control apparatus, starts picture display based on said display timing signal to its own terminal that was received.

19. The display system as set forth in claim 1, wherein:
each of said plurality of terminals is equipped with a clock unit that measures time; and
said control apparatus acquires the differences in times that are measured in said clock units from among said plurality of terminals, and based on the differences in times that were acquired, synchronizes the switching of pictures that are displayed on each of said plurality of terminals.

20. The display system as set forth in claim 1, wherein:
each of said plurality of terminals includes a liquid crystal display unit;
said liquid crystal display unit includes:
a plurality of scan lines;
a plurality of signal lines that intersect with said plurality of scan lines;
a scan line driver that controls the supply of signals to said plurality of scan lines;
a signal line driver that controls the supply of signals to said plurality of signal lines;
a plurality of picture elements provided at each intersection of said plurality of scan lines and said plurality of signal lines;
a plurality of switch elements that are provided at each of said intersections, that each have one terminal connected to the signal line that is provided at the intersection, that each have the other terminal connected to the picture element provided at that intersection, and that each have a control terminal connected to the scan line that is provided at that intersection; and
a plurality of storage capacitances provided at each of said intersections, and that are connected to the other terminal of the switch terminals provided at the intersection in parallel with the picture element that is provided at the intersection;
each of said plurality of switch elements enters an ON state or OFF state by the supply of signals from said scan line driver to the scan line that is connected to its own switch element; and
each signal line driver supplies voltage to each of storage capacitances and picture elements that are connected to, of said plurality of switch elements, a switch element that has been set to the ON state.

21. The display system as set forth in claim 20, wherein:
said liquid crystal unit further includes a backlight and a lighting control unit that controls the lighting and extinguishing of the backlight;
in a picture element write interval that is shorter than a display interval in which said picture elements are displayed on said liquid crystal unit, said lighting control unit extinguishes said backlight and said signal line driver supplies voltage to each of storage capacitances and picture elements that are connected to switch elements that have been set to the ON state; and
said lighting control unit further lights said backlight in all or a portion of an interval that remains after subtracting said picture element write interval from said display interval.

22. The display system as set forth in claim 1, wherein:
each of said plurality of terminals includes a liquid crystal display unit;
said liquid crystal display unit includes:
a plurality of scan lines;
a plurality of write control lines arranged parallel to said plurality of scan lines;
a plurality of signal lines that intersect with said plurality of scan lines and said plurality of write control lines;
a scan line driver that controls the supply of signals to said plurality of scan lines;
a signal line driver that controls the supply of signals to said plurality of signal lines;
a write control circuit that controls the supply of signals to said plurality of write control lines;
a plurality of picture elements provided at each intersection of said plurality of signal lines with said plurality of scan lines and said plurality of write control lines;
a plurality of first switch elements that are provided at each of said intersections, and that each have one terminal connected to the signal line provided at the intersection and a control terminal connected to the scan line provided at the intersection;
a plurality of first storage capacitances that are provided at each of said intersections and that are each connected to the other terminal of the first switch element that is provided at the intersection;
a plurality of second switch elements that are provided at each of said intersections, that each have one terminal connected to the other terminal of the first switch element that is provided at the intersection, that each have the other terminal connected to the picture element provided at the intersection, and that have a control terminal connected to the write control line provided at the intersection; and a plurality of second storage capacitances provided at each of said intersections and that are each connected to the other terminal of the second switch element provided at the intersection;

each of said plurality of first switch elements enters an ON state or OFF state by the supply of signals from said scan line driver to the scan line that is connected to its own switch element; and each signal line driver supplies voltage to first storage capacitances that are connected to, of said plurality of first switch elements, switch elements that have been set to the ON state; and said write control circuit simultaneously sets said plurality of second switches elements to the ON state through said plurality of write control lines after voltage has been supplied to said first storage capacitance by said signal line driver.

23. The display system as set forth in claim 1, wherein each of said plurality of terminals includes:
a frame memory in which picture data that have been received as input are temporarily stored in frame units; and
an overdrive arithmetic unit that, upon the input of picture data, compares the input picture data with picture data of the preceding frame of input picture data that are stored in said frame memory, and that alters gradations of pictures based on the input picture data according to the comparison result.

24. A control apparatus, comprising:
a communication unit that carries out communication with each of a plurality of terminals that display pictures within subframes of successive frames according to display timing signals that are received as input, wherein a plurality of optical shutters are provided respectively corresponding to each of said plurality of terminals, said shutters being placed in a state of transmitting incident light in subframe intervals in which said pictures are displayed on said terminals that correspond to said shutters and in a state of blocking incident light in other subframe intervals in which said pictures are not displayed on said corresponding terminals, wherein said plurality of terminals are arranged in proximity to each other; and
a display control unit that controls the display of said pictures, within said subframes of said successive frames, on each of said plurality of terminals; and
wherein said display control unit determines for each of said plurality of terminals display timings of said pictures such that said pictures are non-simultaneously displayed on said plurality of terminals, and transmits through said communication unit to each of said plurality of terminals a signal that includes the display timing that was determined as said display timing signal.

25. The control apparatus as set forth in claim 24, wherein said display control unit generates, as said display timing signals, signals that cause each of said plurality of terminals to display said pictures and other pictures that differ from said pictures in time divisions, and that synchronize among said plurality of terminals the switching of pictures that are displayed on each of the terminals.

26. The control apparatus as set forth in claim 25, wherein:
said other pictures include canceling pictures that cancel said pictures; and
said display control unit generates as said display timing signal for each of said plurality of terminals, a signal for effecting control such that the display interval of said canceling pictures in the terminal does not overlap with the display intervals of said pictures in the remaining terminals.

27. The control apparatus as set forth in claim 26, wherein:
said other pictures include public pictures that differ from both pictures of said pictures and the canceling pictures; and
said display control unit determines for each of said plurality of terminals the display order of displaying said pictures, said canceling pictures, and said public pictures in time divisions in each frame.

28. The control apparatus as set forth in claim 27, wherein said display control unit includes:
a period determination unit that determines the period of said frame;
a sub-period number determination unit that, based on the number of said plurality of terminals, determines the number of subframes for displaying said pictures, said canceling pictures, and said public pictures in time divisions within said frame for which period is determined in said period determination unit;
a sub-period determination unit that determines periods of each of said subframes that correspond to each of said pictures, said canceling pictures, and said public pictures based on the period of said frame that was determined by said period determination unit and the number of said subframes that was determined by said sub-period number determination unit; and
a display order determination unit that determines for each of said plurality of terminals the display order of said pictures, said canceling pictures, and said public pictures within said frame for which the period was determined by said period determination unit; and
said display order determination unit sets said display order among said plurality of terminals such that intervals of subframes for displaying said pictures do not overlap each other, and moreover, sets said display order among said plurality of terminals such that the intervals of subframes for displaying said pictures do not overlap the intervals of subframes for displaying said canceling pictures.

29. The control apparatus as set forth in claim 28, wherein said display order determination unit randomly sets said display order for each said frame.

30. The control apparatus as set forth in claim 26, wherein said period determination unit randomly sets the period of said frame.

31. The control apparatus as set forth in claim 28, wherein said sub-period determination unit randomly sets the display intervals of each of said pictures, said canceling pictures, and said public pictures within said frame.

32. The control apparatus as set forth in claim 28, wherein said display order determination unit sets said display order among said plurality of terminals such that the intervals of subframes for displaying said canceling pictures do not overlap each other.

33. A display method in a display system that includes a plurality of terminals that display pictures within subframes of successive frames, a control apparatus that carries out communication with said plurality of terminals, and a plurality of optical shutters provided respectively corresponding to each of said plurality of terminals and that carry out communication with corresponding terminals, said shutters being placed in a state of transmitting incident light in subframe intervals in which said pictures are displayed on said terminals that correspond to said shutters and in a state of blocking incident light in other subframe intervals in which said pictures are not displayed on said corresponding terminals, wherein said plurality of terminals are arranged in proximity to each other,; said display method comprising:

determining, by said control apparatus, display timings of said pictures for each of said plurality of terminals such that said pictures are non-simultaneously displayed on each of said plurality of terminals, and transmitting, by said control apparatus, to each of said plurality of terminals a display timing signal that includes the display timing that was determined;

displaying, by each of said plurality of terminals, said pictures, within said subframes of said successive frames, on each of plurality of terminals, in accordance with said display timing signal that was received from said control apparatus, and transmitting, by each of said plurality of terminals, to a corresponding optical shutter a synchronizing signal that indicates the display interval of the pictures; and carrying out, by each of said plurality of optical shutters, switching between a state of transmitting incident light during a period corresponding to displaying said pictures and a state of blocking incident light during another period corresponding to not displaying said pictures in accordance with said synchronizing signal that was received from the corresponding terminal.

34. A non-transitory computer readable medium storing a computer program incorporated in a control apparatus that is capable of communication with each of a plurality of terminals that display pictures within subframes of successive frames, in accordance with display timing signals that are received as input, wherein a plurality of optical shutters are provided respectively corresponding to each of said plurality of terminals, said shutters being placed in a state of transmitting incident light in subframe intervals in which said pictures are displayed on said terminals that correspond to said shutters and in a state of blocking incident light in other subframe intervals in which said pictures are not displayed on said corresponding terminals, wherein said plurality of terminals are arranged in proximity to each other, said program causing a computer of said control apparatus to execute processes of:

determining the display timings of said pictures for each of said plurality of terminals such that said pictures, within said subframes of said successive frames, on each of said plurality of terminals, are non-simultaneously displayed on each of said plurality of terminals; and transmitting a signal that includes said display timings that were determined as said display timing signals to each of said plurality of terminals.

* * * * *